(12) United States Patent
Yoshimura

(10) Patent No.: US 8,535,189 B2
(45) Date of Patent: Sep. 17, 2013

(54) VEHICLE POWER TRANSMISSION DEVICE

(75) Inventor: Takahiro Yoshimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 84 days.

(21) Appl. No.: 13/139,914

(22) PCT Filed: Dec. 15, 2008

(86) PCT No.: PCT/JP2008/072791
§ 371 (c)(1),
(2), (4) Date: Jun. 15, 2011

(87) PCT Pub. No.: WO2010/070725
PCT Pub. Date: Jun. 24, 2010

(65) Prior Publication Data
US 2011/0314960 A1    Dec. 29, 2011

(51) Int. Cl.
*F16H 3/72* (2006.01)
*F16H 37/06* (2006.01)

(52) U.S. Cl.
USPC .............................................. 475/5; 475/205

(58) Field of Classification Search
USPC ............. 475/5, 150, 151, 198, 201, 204, 205, 475/221, 329, 330; 477/3, 7; 903/910
See application file for complete search history.

(56) References Cited

U.S. PATENT DOCUMENTS

| 7,235,029 | B2 * | 6/2007 | Klemen et al. | 475/5 |
| 2006/0108166 | A1 | 5/2006 | Tanaka et al. | |
| 2008/0318720 | A1 * | 12/2008 | Fukuda et al. | 475/5 |
| 2009/0024262 | A1 * | 1/2009 | Amamiya | 701/22 |

FOREIGN PATENT DOCUMENTS

| CN | 102245418 | 11/2011 |
| JP | 2001 260684 | 9/2001 |

(Continued)

OTHER PUBLICATIONS

International Search Report Issued Jan. 27, 2009 in PCT/JP08/072791 filed Dec. 15, 2008.

*Primary Examiner* — Justin Holmes
(74) *Attorney, Agent, or Firm* — Oblon, Spivak, McClelland, Maier & Neustadt, L.L.P.

(57) ABSTRACT

A vehicle power transmission device includes: a power generation device that includes a rotating machine electrically controllable in torque; and a power distribution device including three rotating elements, which are an input rotating element, a first output rotating element operatively coupled to a first wheel, and a second output rotating element operatively coupled to a second wheel, the power distribution device distributing power input to the input rotating element from the power generation device to the first output rotating element and the second output rotating element, the power distribution device being configured such that the input rotating element, the first output rotating element, and the second output rotating element are arranged in this order from one end to the other end on a collinear diagram capable of representing the rotation speeds of the three rotating elements on a straight line, the operation state of the rotating machine being controlled to put the first output rotating element and the second output rotating element into a predetermined differential sate, and the power generation device including: an electric type differential portion with the rotating machine coupled to a differential mechanism in a power transmittable manner to control a differential state between a rotation speed of a differential input member and a rotation speed of a differential output member by controlling the operation state of the rotating machine; and a power source coupled to the differential input member in a power transmittable manner.

11 Claims, 15 Drawing Sheets

(56) References Cited

FOREIGN PATENT DOCUMENTS

| JP | 2003 32802 | 1/2003 |
| JP | 2003 335143 | 11/2003 |
| JP | 2004 114944 | 4/2004 |
| JP | 2005-75095 A | 3/2005 |
| JP | 2006 131132 | 5/2006 |

* cited by examiner

SCHEMATIC

OPERATION TABLE

|     | C0 | B0 | C1 | C2 | B1 | B2 | GEAR RATIO |
|-----|----|----|----|----|----|----|------------|
| 1st | O  |    | O  |    |    | O  | 2.804      |
| 2nd | O  |    | O  |    | O  |    | 1.531      |
| 3rd | O  |    | O  | O  |    |    | 1.000      |
| O/D |    | O  | O  | O  |    |    | 0.705      |
| N   |    |    |    |    |    |    |            |

( O : ENGAGED )

WHEN TURNING AT LOW SPEED

WHEN TURNING AT HIGH SPEED

SLIP ANGLE CHARACTERISTICS

VEHICLE POWER TRANSMISSION DEVICE

TECHNICAL FIELD

The present invention relates to a vehicle power transmission device, and more particularly, to a technique for controlling differential rotation of a plurality of wheels.

BACKGROUND ART

It is widely known a vehicle power transmission device comprising: (a) a power generation device that includes a rotating machine electrically controllable in torque; and (b) a power distribution device including three rotating elements, which are an input rotating element, a first output rotating element operatively coupled to a first wheel, and a second output rotating element operatively coupled to a second wheel, the power distribution device distributing power input to the input rotating element from the power generation device to the first output rotating element and the second output rotating element. One example is a vehicle power transmission device described in Patent Document 1, and the vehicle power transmission device is related to a hybrid drive type front and rear wheel drive vehicle and is equipped with the power generation device having (a-1) an electric type differential portion with the rotating machine (motor generator) coupled to a differential mechanism in a power transmittable manner to control a differential state between a rotation speed of a differential input member and a rotation speed of a differential output member by controlling the operation state of the rotating machine and (a-2) a power source (engine) coupled to the differential input member in a power transmittable manner.

One example is a power transmission device 100 of a hybrid vehicle having a general configuration (schematic) depicted in FIG. 19, which includes a power generation device 101 and a front and rear wheel power distribution device 104. The power generation device 101 includes an engine 110 used as a main power source and an electric type differential portion 102, and the electric type differential portion 102 includes a single pinion type differential planetary gear device 106 as a differential mechanism. A carrier SCA of the differential planetary gear device 106 is coupled via a differential input shaft 108 etc., as a differential input member to the engine 110; a sun gear SS is coupled to a first motor generator MG1 as a rotating machine; a ring gear SR is integrally coupled to a differential output member 112. The front and rear wheel power distribution device 104 is made up mainly of a double pinion type distribution planetary gear device 114, and a ring gear CR of the distribution planetary gear device 114 is an input rotating element and is integrally coupled to the differential output member 112. A sun gear CS is a first output rotating element and is operatively coupled to a rear wheel (first wheel) via a rear-wheel output shaft 116 etc., and a carrier CCA is a second output rotating element and is operatively coupled to a front wheel (second wheel) via a front-wheel output gear 118 etc. The rear-wheel output shaft 116 is coupled to a second motor generator MG2 as a sub-power source in a power transmittable manner.

As depicted in a collinear diagram of FIG. 20 capable of representing the rotation speeds of the portions of the electric type differential portion 102 with a straight line, the power transmission device 100 as described above controls an engine rotation speed NE, i.e., the rotation speed of the differential input shaft 108 in consideration of fuel economy etc., and the first motor generator MG1 is subjected to the regenerative control so as to achieve a predetermined rotation speed NMG1 determined depending on the rotation speed of the differential output member 112. i.e., vehicle speed V. The power running control of the second motor generator MG2 is performed with the electric energy acquired from the regenerative control of the first motor generator MG1 to add an assist torque to the rear wheel side, and an engine load is correspondingly reduced. A ratio of intervals among the rotating elements (SS, SCA, SR) in the collinear diagram of FIG. 20 is determined depending on a gear ratio (=number of teeth of sun gear/number of teeth of ring gear) ρS of the differential planetary gear device 106. FIG. 20 also depicts a collinear diagram related to the front and rear wheel power distribution device 104; "Rr" is the rotation speed of the rear-wheel output shaft 116, i.e., the rotation speed of the sun gear CS; "Fr" is the rotation speed of the front-wheel output gear 118, i.e., the rotation speed of the carrier CCA; and this example represents the case that the gear ratio from the rear-wheel output shaft 116 to the rear wheel is the same as the gear ratio from the front-wheel output gear 118 to the front wheel and that the rotation speeds thereof are equivalent to each other. For the front and rear wheel power distribution device 104, a ratio of intervals among three rotating elements including the ring gear CR is determined depending on a gear ratio ρC of the distribution planetary gear device 114.

Patent Document 1: Japanese Laid-Open Patent Publication No. 2004-114944

DISCLOSURE OF THE INVENTION

Problem to be Solved by the Invention

However, since such a conventional vehicle power transmission device allows a first output rotating element (the sun gear CS of FIG. 19) and a second output rotating element (the carrier CCA of FIG. 19) of a power distribution device to differentially rotate using an input rotating element (the ring gear CR of FIG. 19) as a supporting point, a differential control means such as a clutch or a disc spring must separately be disposed so as to limit the differential motion in the case of oversteer at the time of turning, for example.

The present invention was conceived in view of the situations and it is therefore an object of the present invention to enable a convenient means to control a differential motion between a first output rotating element and a second output rotating element for a power distribution device that distributes power input from a power generation device to the first output rotating element and the second output rotating element.

Means for Solving the Problems

To achieve the above object, the first aspect of the present invention provides a vehicle power transmission device comprising: (a) a power generation device that includes a rotating machine electrically controllable in torque; and (b) a power distribution device including three rotating elements, which are an input rotating element, a first output rotating element operatively coupled to a first wheel, and a second output rotating element operatively coupled to a second wheel, the power distribution device distributing power input to the input rotating element from the power generation device to the first output rotating element and the second output rotating element, (c) the power distribution device being configured such that the input rotating element, the first output rotating element, and the second output rotating element are arranged in this order from one end to the other end on a collinear diagram capable of representing the rotation speeds of the three rotating elements on a straight line, (d) the operation state of the rotating machine being controlled to put the first output rotating element and the second rotating element into a predetermined differential state, and the power generation device including: (e) an electric type differential portion with the rotating machine coupled to a differential mechanism in a power transmittable manner to control a differential state between a rotation speed of a differential input member and a rotation speed of a differential output member by controlling the operation state of the rotating machine; and (f) a power source coupled to the differential input member in a power transmittable manner.

The third aspect of the invention provides the vehicle power transmission device recited in the first aspect of the invention, wherein the vehicle power transmission device calculates an operational point of the rotating machine at which the first output rotating element and the second output rotating element are put into a predetermined differential state based on a vehicle traveling state to control the rotating machine to operate at the operation point.

The fourth aspect of the invention provides the vehicle power transmission device recited in the first or third aspect of the invention, wherein the vehicle power transmission device suppresses a rotation speed change of the rotating machine to limit a differential motion of the first output rotating element and the second output rotating element relative to each other.

The fifth aspect of the invention provides the vehicle power transmission device recited in the first aspect of the invention, wherein the vehicle power transmission device suppresses a rotation speed change of the rotating machine to limit a differential motion of the first output rotating element and the second output rotating element relative to each other and controls the power source to suppress a change in rotation speed of the differential input member due to the suppression of the rotation speed change of the rotating machine.

The Effects of the Invention

The vehicular power transmission device described above is configured such that an input rotating element, a first output rotating element, and a second output rotating element are arranged in series from one end to the other end on the collinear diagram capable of representing the rotation speeds of the three rotating elements of the power distribution device on a straight line. Therefore, a rotation speed of the input rotating element limits differential rotation between the first output rotating element and the second output rotating element. In other words, the rotation speeds of the first output rotating element and the second output rotating element are limited such that the rotation speeds of the first output rotating element and the second output rotating element are linked in a straight line relative to the rotation speed of the input rotating element located at one end of the collinear diagram. Therefore, by controlling the rotation speed of the input rotating element through the rotation speed control of the rotating machine of the power generation device, for example, the differential rotation between the first output rotating element and the second output rotating element can be limited and can be put into a predetermined differential state at the time of turning. Also, by controlling the torque of the rotating machine of the power generation device, the variability of the rotation speed of the input rotating element can be controlled and, therefore, the rotation speed change can be limited or allowed. If the torque of the rotating machine is increased to limit a rotation speed change of the input rotating element, the differential rotation is limited between the first output rotating element and the second output rotating element. If the torque of the rotating machine is reduced to allow a rotation speed change of the input rotating element, the differential rotation is allowed between the first output rotating element and the second output rotating element.

Since the vehicular power transmission device of present invention can control an operation state of the rotation machine of the power generation device, i.e., the rotation speed and the torque, and control the rotation speed of the input rotation element and the variability of the rotation speed to limit or allow the differential rotation of the first output rotating element and the second rotating element, it is not necessary to separately provide a mechanical differential control means such as a clutch or a disc spring and the device is simply and inexpensively configured. Since the power generation device in the second aspect of the invention has the electric type differential portion, and the rotation speed of the differential output member, i.e., the rotation speed of the input rotating element of the power distribution device is determined by the rotation speed of both the rotation machine and the power source, there is a case that differential rotation can be prohibited by the rotation speed control of the rotation machine, for example, or achieve a predetermined differential state, or the torque of the rotating machine is increased to limit the differential rotation. In this case, for example, when an inverse input torque from the wheels is abruptly changed, a load torque can be adsorbed by a rotation speed change of the power source to prevent an excessive load from acting on the rotation machine and other rotating elements.

Since the third aspect of the invention includes calculating an operational point of the rotation machine at which the first output rotating element and the second output rotating element are put into a predetermined differential state based on the vehicle traveling state, and the rotation machine is controlled to operate at the operational point, the differential rotation can be allowed during turning etc., while limiting the differential rotation during straight travel, to prevent a tight corner brake phenomenon from occurring or to suppress understeer.

In the fourth aspect of the invention, the rotation speed change of the rotation machine is suppressed to limit the differential motion of the first output rotating element and the second output rotating element relative to each other and, therefore, the travel stability can be improved during straight travel or the oversteer during turning travel can be suppressed, for example.

In the fifth aspect of the invention, the power generation device has the electric type differential portion, the rotation speed change of the rotation machine is suppressed to limit the differential motion of the first output rotating element and the second output rotating element relative to each other and the power source is controlled to suppress the change in the rotation speed of the differential input member due to the suppression of the rotation speed change of the rotating machine, therefore, the differential motion of the first output rotating element and the second output rotating element is suitably limited and the travel stability can be improved during straight travel or the oversteer during turning travel can be suppressed as well as the fourth aspect of the invention.

Figure 1:
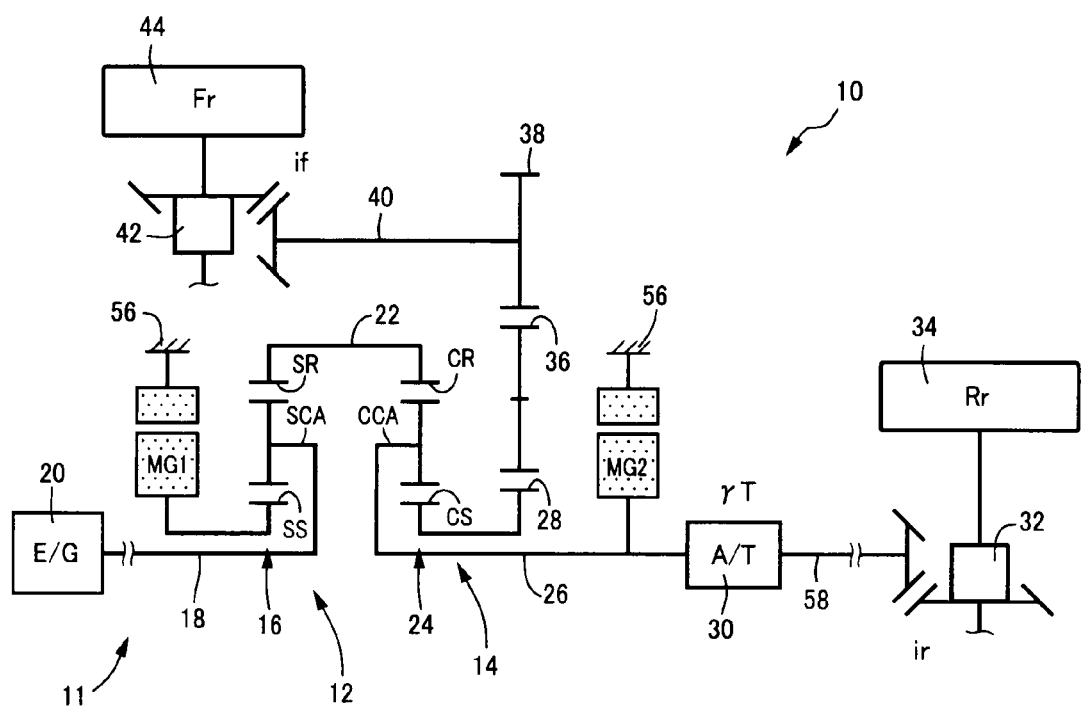
FIG. 1 is a schematic for explaining a power transmission device of a front and rear wheel drive vehicle applied the present invention.

DESCRIPTION OF REFERENCE NUMERALS 10,260,270: power transmission device 11,260: power generation device 12,250: electric type differential portion 14,210,220,230,240: front and rear wheel power distribution device (power distribution device) 16: differential planetary gear device (differential mechanical) 18: differential input shaft (differential input member) 20: engine (power source) 22: differential output member 34: rear wheel (first wheel) 44: front wheel (second wheel) 80: electronic control device 92: front and rear wheel differential control means 272: left and right wheel power distribution device (power distribution device) 276L: left wheel (first wheel) 276R: right wheel (second wheel) MG1: first motor generator

BEST MODES FOR CARRYING OUT THE INVENTION

Although the present invention is preferably applied to a vehicle power transmission device that includes a power generation device having an electric type differential portion as described in the second aspect of the present invention, the present invention is also applicable in such a case that the power generation device has only a rotating machine. An internal combustion engine such as a gasoline engine or a diesel engine is preferably used as a power source coupled to a differential input member of the electric type differential portion and a hybrid drive type can be employed by additionally disposing an electric motor (including a motor generator) as a sub-power source between a power distribution device and a wheel, for example. A power source other than an internal combustion engine such as an electric motor or a motor generator can also be employed as the power source coupled to the differential input member.

Although the present invention is preferably applied to differential control of front and rear wheels in a front and rear wheel drive vehicle including a first wheel as one of the front and rear wheels and a second wheel as the other of the front and rear wheels, the present invention is also applicable to differential control of left and right wheels including a first wheel as one of the left and right wheels and a second wheel as the other of the left and right wheels.

Although the electric type differential portion includes, for example, a single pinion or double pinion type single planetary gear device as a differential mechanism, various forms are available such as a configuration using a plurality of planetary gear devices or using a bevel gear type differential device. Although this electric type differential portion is configured such that a rotating element coupled to a differential input member is located in the middle on a collinear diagram capable of representing on a straight line the rotation speeds of three rotating elements of the differential mechanism coupled respectively to, for example, the rotating machine, the differential input member, and a differential output member, the present invention is also applicable to the configuration with the rotating element coupled to the differential output member located in the middle.

Although the rotating machine is a rotating electric machine and is preferably implemented by using a motor generator capable of selectively acquiring functions of an electric motor and an electric generator, an electric generator can be employed as the rotating machine if the regenerative control of the rotating machine is performed to receive a reaction force of a power source with a regenerative torque and to recover electric energy when the electric type differential portion is included, for example, and an electric motor can be employed as the rotating machine if the rotating machine is directly coupled as a power generation device to an input rotating element of the power distribution device. The power generation device can be made up by using both an electric motor and an electric generator.

Although the power distribution device includes, for example, a single pinion or double pinion type single planetary gear device as a differential mechanism as is the case with the electric type differential portion, various forms are available such as a configuration using a plurality of planetary gear devices or using a bevel gear type differential device. If the differential mechanism is a single pinion type single planetary gear device, a carrier located in the middle on the collinear diagram is a first output rotating element, and a sun gear and a ring gear correspond to one and the other of an input rotating element and a second output rotating element. If the differential mechanism is a double pinion type single planetary gear device, the ring gear located in the middle on the collinear diagram is the first output rotating element, and the sun gear and the carrier correspond to one and the other of the input rotating element and the second output rotating element.

Although the input rotating element of the power distribution device and the differential output member may integrally be coupled, various forms are available such as coupling via an interrupting device such as a clutch or coupling via a transmission that increases or decreases speed. Even if the power generation device has only a rotating machine, various forms are available for a coupling form between the rotating machine and the input rotating element as is the case with the differential output member.

In the case of the power transmission device of a front and rear wheel drive vehicle, a stepped or stepless transmission is disposed as needed on a power transmission path from the first output rotating element to the first wheel or on a power transmission path from the second output rotating element to the second wheel. The transmission can be disposed on a power transmission path from the power generation device to the power distribution device. If a gear ratio from the first output rotating element to the first wheel is different from a gear ratio from the second output rotating element to the second wheel due to the presence/absence of the transmission, the rotation speeds of the output rotating elements are different from each other because of the difference between the gear ratios; however, the difference in rotation speed in this case does not mean the differential motion, and the differential motion is a rotation speed change relative to a reference rotation speed determined by the gear ratios and a vehicle sped (average wheel rotation speed).

Although a operational point of the rotating machine putting the first output rotating element and the second output rotating element into a predetermined differential state is calculated based on a vehicle traveling state and the rotating machine is controlled to operate at the operational point in the third aspect of the present invention, various forms are available and, for example, it may be determined whether a differential motion is necessary for the first output rotating element and the second output rotating element based on a vehicle traveling state and the torque of the rotating machine may be reduced to only allow a rotation speed change in the input rotating element if the differential motion is necessary. The vehicle traveling state represents a steering angle, a vehicle speed, a power source output (such as a throttle valve opening degree and a motor torque) involved in a differential motion of front and rear wheels or left and right wheels.

When the third aspect of the present invention is implemented, for example, a rotation speed difference $\Delta N$ between the first wheel and the second wheel is calculated (predicted) in advance based on the vehicle traveling state to obtain a rotation speed Ndef of the input rotating element allowing the differential rotation at the rotation speed difference $\Delta N$ based on a gear ratio etc., of the power distribution device, and the rotation speed of the rotating machine of the power generation device is controlled such that the input rotating element achieves the rotation speed Ndef.

In the fourth and fifth aspects of the present invention, for example, an actual yaw rate (yaw angle speed) Y is detected or calculated and, if the yaw rate Y is substantially the same as a predetermined target yaw rate Yr, the current control is continued, while if the yaw rate Y is greater than the target yaw rate Yr, i.e., in the case of the oversteer tendency, a torque of a rotating machine is corrected to suppress a rotation speed change of the rotating machine so as to limit the differential motion to suppress oversteer and, in the case of the fifth aspect of the present invention, a torque of a power source is also corrected to suppress a rotation speed change of the differential input member. In this case, if a sub-power source such as an electric motor is disposed between the first output rotating element and the first wheel or between the second output rotating element and the second wheel in a power transmittable manner, it is desirable to correct the torque of the sub-power source to suppress drive force variations caused by torque changes of the rotating machine and the power source.

If the yaw rate Y is smaller than the target yaw rate Yr, i.e., in the case of the understeer tendency, the torque of the rotating machine is corrected to allow a rotation speed change of the rotating machine so as to allow the differential motion to suppress understeer. In this case, if a sub-power source such as an electric motor is disposed between the first output rotating element and the first wheel or between the second output rotating element and the second wheel in a power transmittable manner, it is desirable to correct the torque of the sub-power source to suppress drive force variations caused by a torque change of the rotating machine.

EMBODIMENTS

Embodiments of the present invention will now be described in detail with reference to the drawings.

FIG. 1 is a schematic for explaining a power transmission device 10 of a hybrid drive type front and rear wheel drive vehicle of one embodiment of the present invention, which includes a power generation device 11 and a front and rear wheel power distribution device 14. The power generation device 11 includes an engine 20 used as a main power source and an electric type differential portion 12, and the electric type differential portion 12 includes a single pinion type differential planetary gear device 16 as a differential mechanism. A carrier SCA of the differential planetary gear device 16 is coupled via a differential input shaft 18, etc., as a differential input member to the engine 20; a sun gear SS is coupled to a first motor generator MG1; and a ring gear SR is integrally coupled to a differential output member 22. The engine 20 is an internal combustion engine such as a gasoline engine or a diesel engine and is coupled to the differential input shaft 18 directly or indirectly via a pulsation absorbing damper not depicted etc. Although the first motor generator MG1 is disposed as a rotating machine and can selectively fulfill functions of both an electric motor and an electric generator, the first motor generator MG1 is used mainly as an electric generator in this embodiment.

The electric type differential portion 12 configured as described above is put into a differential state where a differential action is achieved by enabling the three rotating elements of the differential planetary gear device 16, i.e., the sun gear SS, the carrier SCA, and the ring gear SR to rotate relative to each other and, therefore, the output of the engine 20 is distributed to the first motor generator MG1 and the differential output member 22. When a portion of the distributed output of the engine 20 rotationally drives the first motor generator MG1, electric energy is generated through the regenerative control (electric generation control) of the first motor generator MG1; the electric energy is used for the power running control of a second motor generator MG2 disposed on a power transmission path on the rear wheel side; and excess electric energy charges an electric storage device 64 (see FIG. 5) that is a battery. The electric type differential portion 12 is allowed to function as an electric differential device to achieve a so-called continuously variable transmission state (electric CVT state) and the rotation of the differential output member 22 is continuously varied regardless of a predetermined rotation of the engine 20 depending on the rotation speed of the first motor generator MG1. Therefore, the electric type differential portion 12 functions as an electric stepless transmission with a gear ratio $\gamma S$ (=rotation speed of the differential input shaft 18/rotation speed of the differential output member 22) continuously varied from a minimum value $\gamma Smin$ to a maximum value $\gamma Smax$. By controlling the operation state of the first motor generator MG1 coupled to the electric type differential portion 12 in a power transmittable manner as described above, the differential state is controlled between the rotation speed of the differential input shaft 18, i.e., the engine rotation speed NE and the rotation speed of the differential output member 22.

The front and rear wheel power distribution device 14 is made up mainly of a single pinion type distribution planetary gear device 24 acting as a differential mechanism, and a ring gear CR of the distribution planetary gear device 24 is an input rotating element and is integrally coupled to the differential output member 22. A carrier CCA is integrally coupled to a rear-wheel output shaft 26 and a sun gear CS is integrally coupled to a front-wheel output gear 28. The rear-wheel output shaft 26 is operatively coupled to left and right rear wheels 34 via an automatic transmission 30 and a rear-side left and right wheel power distribution device 32, and a second motor generator MG2 is coupled to the power transmission path between the automatic transmission 30 and the carrier CCA in a power transmittable manner. Although the second motor generator MG2 is disposed as a sub-power source and can selectively fulfill functions of both an electric motor and an electric generator, the second motor generator MG2 is used mainly as an electric motor in this embodiment to rotationally drive the rear wheels 34 for the motor traveling and to add an assist torque during the traveling using the engine 20 as a power source. The front-wheel output gear 28 is operatively coupled to left and right front wheels 44 via a counter gear 36, a driven gear 38, a transmission shaft 40, and a front-side left and right wheel power distribution device 42. Since the electric type differential portion 12, the front and rear wheel power distribution device 14, the first motor generator MG1, and the second motor generator MG2 are configured substantially symmetrically relative to the shaft center thereof, the lower half is not depicted in the schematic of FIG. 1.

Therefore, the front and rear wheel drive vehicle of this embodiment is a four-wheel-drive vehicle based on an FR (front-engine rear-drive) vehicle and the planetary gear type front and rear wheel power distribution device 14 is disposed between the electric type differential portion 12 and the second motor generator MG2 so as to transmit the power from the electric type differential portion 12 to the front wheels 44.

Figure 8:
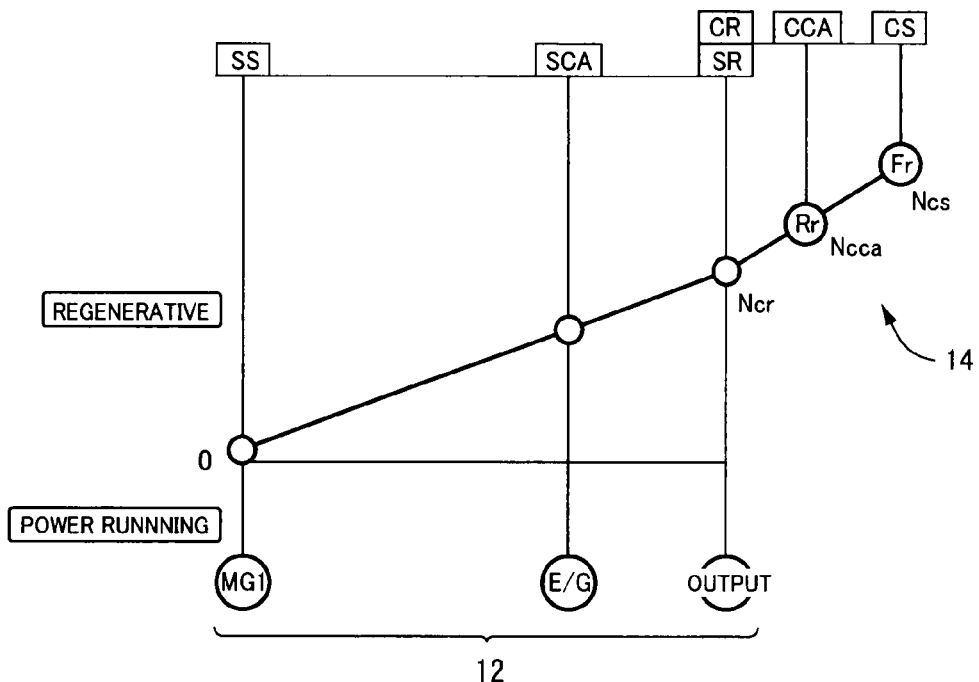
FIG. 8 is a collinear diagram capable of representing on a straight line the relationship in the rotation speeds of the three rotating elements of the electric type differential portion of the power transmission device of FIG. 1 and also depicts a collinear diagram of the front and rear wheel power distribution device.

FIG. 8 is a collinear diagram capable of representing on a straight line the rotation speeds of the three rotating elements (SS, SCA, SR) of the electric type differential portion 12 and also depicts a collinear diagram of the front and rear wheel power distribution device 14. In the electric type differential portion 12 that achieves the differential action with the single pinion type differential planetary gear device 16, a ratio of intervals among the rotating elements (SS, SCA, SR) is determined depending on a gear ratio $\rho S$ of the differential planetary gear device 16 and, in the front and rear wheel power distribution device 14 that achieves the differential action with the single pinion type distribution planetary gear device 24, a ratio of intervals among the rotating elements (CS, CCA, CR) is determined depending on a gear ratio $\rho C$ of the distribution planetary gear device 24. In this embodiment, the engine 20 is coupled to the carrier SCA located in the middle on the collinear diagram among the three rotating elements (SS, SCA, SR) of the electric type differential portion 12; the differential output member 22 is coupled to the ring gear SR on the side of a narrower interval from the carrier SCA; and the first motor generator MG1 is coupled to the sun gear SS on the side of a wider interval. Among the three rotating elements (CS, CCA, CR) of the front and rear wheel power distribution device 14, the carrier CCA located in the middle on the collinear diagram is a first output rotating element and is operatively coupled via the rear-wheel output shaft 26 to the rear wheel 34 in this embodiment; the ring gear CR on the side of a narrower interval is an input rotating element and is integrally coupled to the ring gear SR of the electric type differential portion 12; and the sun gear CS on the opposite side is a second output rotating element and is operatively coupled to the front wheel 44 via the front-wheel output gear 28. The rear wheel 34 corresponds to a first wheel that is one of the front and rear wheels and the front wheel 44 corresponds to a second wheel that is the other of the front and rear wheels. The gear ratio $\rho S$ of the differential planetary gear device 16 and the gear ratio $\rho C$ of the distribution planetary gear device 24 are appropriately determined in consideration of a torque distribution ratio etc.

The front-wheel output gear 28 and the driven gear 38 have the same number of teeth and are rotated at a constant speed in the same direction; the final reduction ratio (differential ratio) it on the rear wheel 34 side is equivalent to the final reduction ratio (differential ratio) if on the front wheel 44 side; and, in the case of a gear ratio $\gamma T=1$ in the automatic transmission 30, the gear ratios $\gamma r$ and $\gamma f$ from the front and rear wheel power distribution device 14 to the rear wheel 34 and the front wheel 44 are equivalent to each other. As a result, during straight traveling, the carrier CCA and the sun gear CS are rotated at the same rotation speed and the front and rear wheel power distribution device 14 is substantially integrally rotated. On the other hand, at the time of the speed-increasing gear ratio when the gear ratio $\gamma T$ of the automatic transmission 30 is smaller than one, since the gear ratio yr from the front and rear wheel power distribution device 14 to the rear wheel 34 becomes smaller than the gear ratio $\gamma f$ to the front wheel 44, the carrier CCA on the rear wheel 34 side is rotated slower relatively to the sun gear CS on the front wheel 44 side as depicted in FIG. 8 during straight traveling, and the rotation speed becomes slower in the ring gear CR that is the input rotating element, i.e., the differential output member 22 and the ring gear SR than the carrier CCA depending on the gear ratio ρC. At the time of the speed-decreasing gear ratio when the gear ratio γT of the automatic transmission 30 is greater than one, since the gear ratio γr from the front and rear wheel power distribution device 14 to the rear wheel 34 becomes greater than the gear ratio γf to the front wheel 44, the carrier CCA on the rear wheel 34 side is rotated faster relatively to the sun gear CS on the front wheel 44 side conversely to FIG. 8 during straight traveling, and the rotation speed becomes faster in the ring gear CR that is the input rotating element, i.e., the differential output member 22 and the ring gear SR than the carrier CCA depending on the gear ratio ρC.

The automatic transmission 30 corresponds to a shifting portion and is a stepped transmission having the gear ratio γT selectable from a speed-decreasing gear ratio greater than one to a speed-increasing gear ratio smaller than one. FIG. 2 is a diagram for explaining an example of the automatic transmission 30 as described above and (a) is a schematic of a planetary gear type transmission including a single pinion type first planetary gear device 50, a single pinion type second planetary gear device 52, and a single pinion type third planetary gear device 54. The first planetary gear device 50 includes a first sun gear S1, a first carrier CA1 that supports a planetary gear in a rotatable and revolvable manner, and a first ring gear R1 engaging with the first sun gear S1 via the planetary gear, and the first carrier CA1 is integrally coupled to the rear-wheel output shaft 26. The first sun gear S1 is selectively coupled to a transmission case (hereinafter, simply a case) 56 via a brake B0 to stop rotation and is selectively coupled to the first carrier CA1 via a clutch C0.

The second planetary gear device 52 includes a second sun gear S2, a second carrier CA2 that supports a planetary gear in a rotatable and revolvable manner, and a second ring gear R2 engaging with the second sun gear S2 via the planetary gear, and the third planetary gear device 54 includes a third sun gear S3, a third carrier CA3 that supports a planetary gear in a rotatable and revolvable manner, and a third ring gear R3 engaging with the third sun gear S3 via the planetary gear. The second ring gear R2 is selectively coupled to the first ring gear R1 via a clutch C1. The second sun gear S2 and the third sun gear S3 are integrally coupled to each other, selectively coupled to the first ring gear R1 via a clutch C2, and selectively coupled to the case 56 via a brake B1 to stop rotation. The third carrier CA3 is selectively coupled to the case 56 via a brake B2 to stop rotation. The second carrier CA2 and the third ring gear R3 are integrally coupled to each other and are integrally coupled to an AT output shaft 58 to output rotation after shifting gears. Since the automatic transmission 30 is also configured substantially symmetrically relative to the shaft center, the lower half is not depicted in the schematic of FIG. 2($a$).

The clutches C0, C1, C2, and the brakes B0, B1, B2 (hereinafter, simply, clutches C and brakes B if not particularly distinguished) are hydraulic friction engagement devices and are made up as a wet multi-plate type with a hydraulic actuator pressing a plurality of friction plates overlapped with each other or as a band brake with a hydraulic actuator fastening one end of one or two bands wrapped around an outer peripheral surface of a rotating drum, integrally coupling members on the both sides of the devices interposed therebetween. These clutches C and brakes B are selectively engaged and released as depicted in an operation table of FIG. 2($b$) to establish four forward gear stages from a first speed gear stage "1st" to an O/D gear stage "O/D", a neutral "N" for interrupting the power transmission, etc. The first speed gear stage "1st" and the second speed gear stage "2nd" have the gear ratio γT (=rotation speed of the rear-wheel output shaft 26/rotation speed of the AT output shaft 58) that is a speed-decreasing gear ratio greater than one, and the O/D gear stage "O/D" has the gear ratio γT that is a speed-increasing gear ratio smaller than one. The gear ratio γT described in FIG. 2($b$) is an example in the case of a gear ratio ρ1 of the first planetary gear device 50=0.418, a gear ratio ρ2 of the second planetary gear device 52=0.532, and a gear ratio ρ3 of the third planetary gear device 54=0.418. Backward traveling is performed by rotationally driving the second motor generator MG2 in the inverse rotation direction while the automatic transmission 30 is set to the first speed gear stage "1st", for example.

Although a stepless transmission is generally made up of the electric type differential portion 12 functioning as a stepless transmission, and the automatic transmission 30 in the power transmission device 10 configured as described above, the electric type differential portion 12 and the automatic transmission 30 can form the state equivalent to a stepped transmission by performing control such that the gear ratio γS of the electric type differential portion 12 is kept constant. Specifically, when the electric type differential portion 12 functions as a stepless transmission and the automatic transmission 30 in series with the electric type differential portion 12 functions as a stepped transmission, the rotation speeds of the differential output member 22 and the rear-wheel output shaft 26 are varied in a stepless manner for at least one gear stage G of the automatic transmission 30, and a stepless gear ratio width is acquired in the gear stage G. A total gear ratio of the power transmission device 10 is acquired for each gear stage by performing control such that the gear ratio γS of the electric type differential portion 12 is kept constant and by selectively performing engagement operation of the clutches C and the brakes B to establish any one of the first speed gear stage "1st" to the O/D gear stage "O/D". For example, if the rotation speed NMG1 of the first motor generator MG1 is controlled such that the gear ratio γS of the electric type differential portion 12 is fixed to "1", a total gear ratio of the electric type differential portion 12 and the automatic transmission 30 is the same as the gear ratio γT of each gear stage of the first speed gear stage "1st" to the O/D gear stage "O/D" of the automatic transmission 30.

Figure 3:
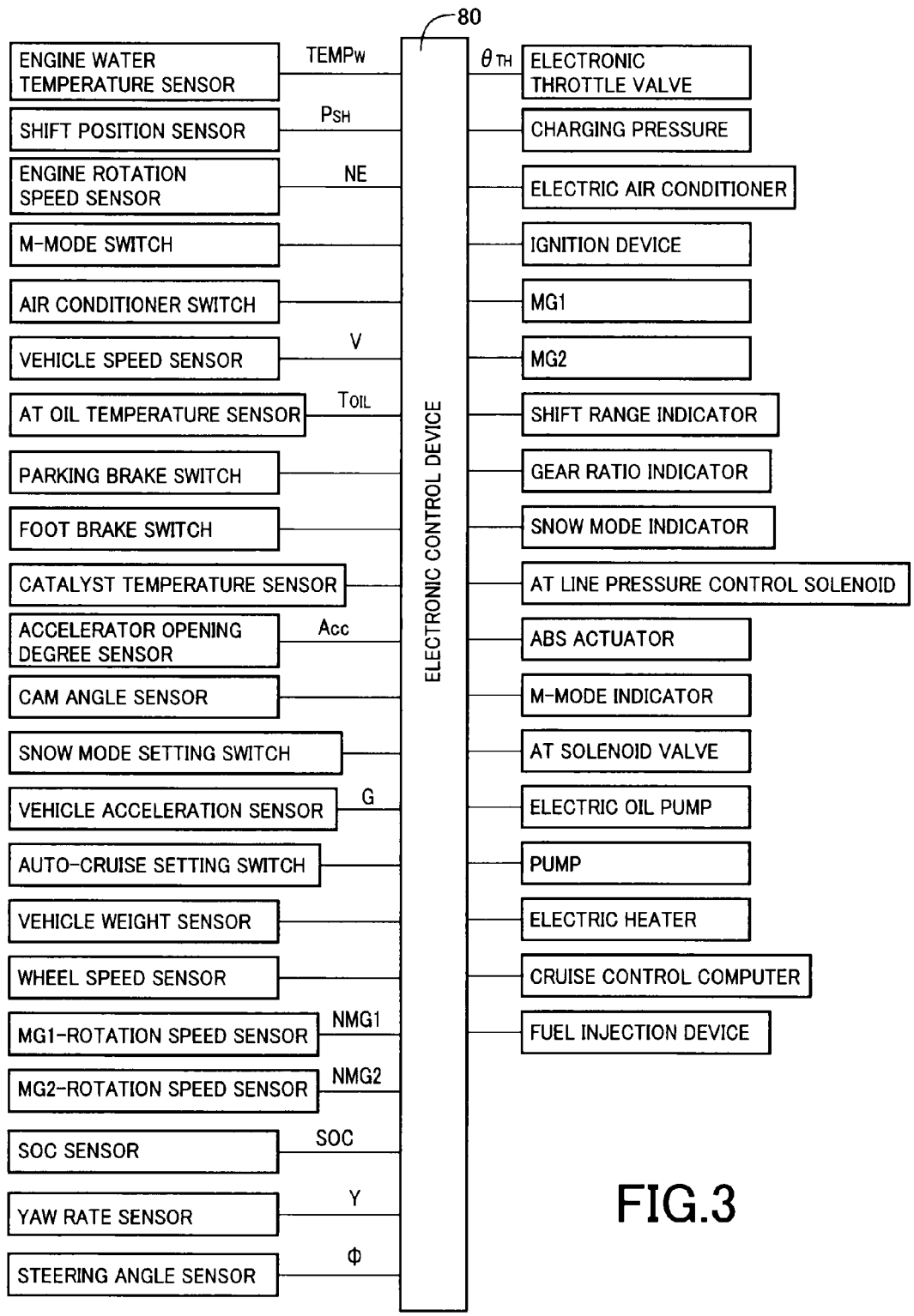
FIG. 3 is a diagram for explaining an example of an input or output signal of an electronic control device that the power transmission device of FIG. 1 includes.

FIG. 3 exemplarily illustrates signals input to an electronic control device 80 for controlling the power transmission device 10 of this embodiment and signals output from the electronic control device 80. The electronic control device 80 includes a so-called microcomputer made up of CPU, ROM, RAM, I/O interface, etc., and executes signal processes in accordance with programs stored in advance in the ROM, while utilizing a temporary storage function of the RAM, to execute the hybrid drive control related to the engine 20, the first motor generator MG1, and the second motor generator MG2 and the shift control of the automatic transmission 30.

The electronic control device 80 is supplied, from sensors, switches, etc., as depicted in FIG. 3, with a signal indicative of an engine water temperature $TEMP_W$, signals indicative of a shift position $P_{SH}$ of a shift lever 66 (see FIG. 4) and the number of operations at an "M" position, a signal indicative of an engine rotation speed NE that is the rotation speed of the engine 20, a signal giving a command for an M-mode (manual shift traveling mode), a signal indicative of operation of an air conditioner, a signal indicative of a vehicle speed V corresponding to the rotation speed $N_{OUT}$ of the AT output shaft 58, a signal indicative of an operating oil temperature $T_{OIL}$ of the automatic transmission 30, a signal indicative of a parking brake operation, a signal indicative of a foot brake operation, a signal indicative of a catalyst temperature, a signal indicative of an accelerator operation amount (opening degree) Acc that is an amount of an accelerator pedal operation corresponding to an output request amount of a driver, a signal indicative of a cam angle, a signal indicative of a snow mode setup, a signal indicative of longitudinal acceleration G of a vehicle, a signal indicative of auto-cruise travelling, a signal indicative of a weight of a vehicle (vehicle weight), a signal indicative of a wheel speed for each of wheels, a signal indicative of the rotation speed NMG1 of the first motor generator MG1, a signal indicative of a rotation speed NMG2 of the second motor generator MG2, a signal indicative of an electric charge amount (remaining amount) SOC of the electric storage device 64, a signal indicative of the yaw rate (yaw angle speed) Y, a signal indicative of a steering angle Φ of the front wheel 34, etc.

The electronic control device 80 outputs control signals to an engine output control device 60 (see FIG. 5) that controls engine output, for example, a drive signal to a throttle actuator that operates a throttle valve opening degree $\theta_{TH}$ of an electronic throttle valve disposed in an induction pipe of the engine 20, a fuel supply amount signal that controls a fuel supply amount into the induction pipe or cylinders of the engine 20 from a fuel injection device, an ignition signal that gives a command for the timing of the ignition of the engine 20 by an ignition device, a charging pressure adjusting signal for adjusting a charging pressure, etc. The electronic control device 80 also outputs an electric air conditioner drive signal for activating an electric air conditioner; command signals that gives commands for the operations of the first motor generator MG1 and the second motor generator MG2 respectively; a shift position (operational position) display signal for activating a shift indictor; a gear ratio display signal for displaying a gear ratio; a snow mode display signal for displaying that the snow mode is in operation; an ABS activation signal for activating an ABS actuator that prevents wheels from slipping at the time of braking; an M-mode display signal for displaying that the M-mode is selected; a valve command signal for activating an electromagnetic valve (linear solenoid valve) included in a hydraulic control circuit 70 (see FIG. 5) so as to control the hydraulic actuator of the hydraulic friction engagement devices of the electric type differential portion 12 and the automatic transmission 30; a signal for regulating a line oil pressure PL with a regulator valve (pressure regulating valve) disposed in the hydraulic control circuit 70; a drive command signal for activating an electric oil pump that is an oil pressure source of an original pressure for regulating the line oil pressure PL; a signal for driving an electric heater; a signal to a computer for controlling the cruise control, etc.

Figure 4:
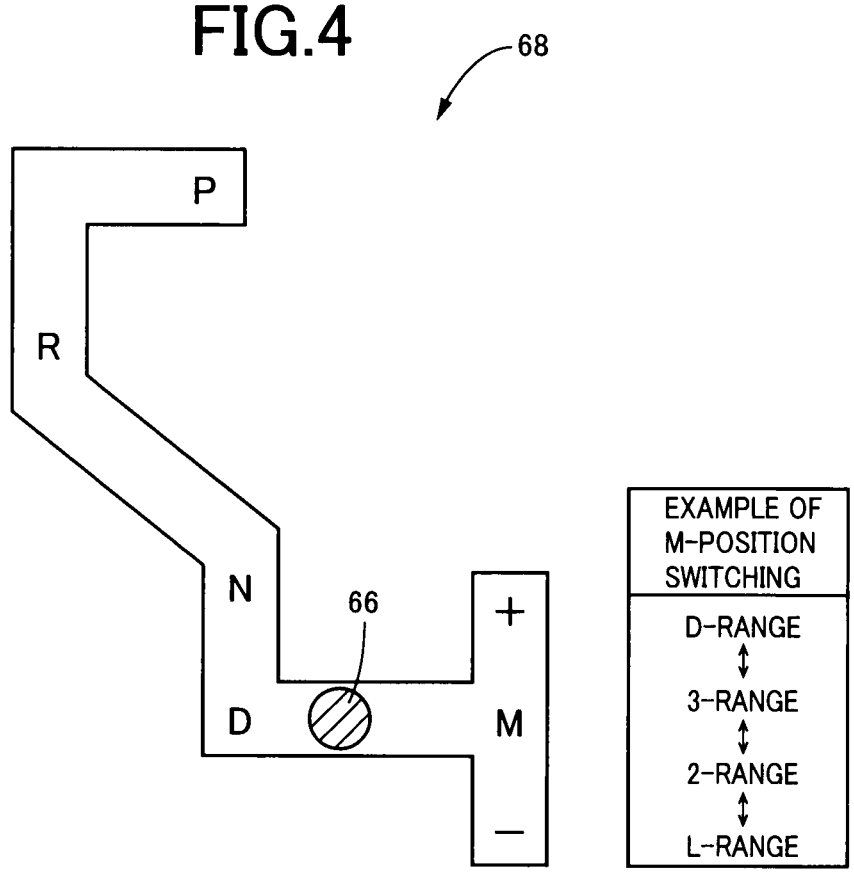
FIG. 4 is a diagram for explaining an example of a shift operation device provided at the power transmission device of FIG. 1.

FIG. 4 is a diagram of an example of a shift operation device 68 as a switching device that switches a plurality of types of shift positions $P_{SH}$ through artificial manipulation. The shift operation device 68 is disposed next to a driver's seat, for example, and includes the shift lever 66 operated so as to select a plurality of types of shift positions $P_{SH}$. The shift lever 66 is arranged to be manually operated to a "P (parking)" position for parking used for being in a neutral state, i.e., neutral state with the power transmission path interrupted in the power transmission device 10 and for locking the AT output shaft 58 of the automatic transmission 30; an "R (reverse)" position for backward traveling; an "N (neutral)" position for being in the neutral state with the power transmission path interrupted in the power transmission device 10; a "D (drive)" position for achieving an automatic transmission mode (D-range) to execute the automatic transmission control in a stepless gear ratio width of the electric type differential portion 12 and all the forward gear stages "1st" to "O/D" of the automatic transmission 30; or an "M (manual)" position for achieving a manual transmission traveling mode (M-mode) to set a so-called shift range that limits shift stages on the high-speed side in the automatic transmission 30.

The "M" position is disposed at the same position as the "D" position in the longitudinal direction of a vehicle adjacently along the width direction of the vehicle, for example, and when the shift lever 66 is operated to the "M" position, any one of four shift ranges from D-range to L-range is selected depending on the operation of the shift lever 66. Specifically, the "M" position is provided with an upshift position "+" and a downshift position "−" along the longitudinal direction of a vehicle and each time the shift lever 66 is operated to the upshift position "+" or the downshift position "−", the shift range goes up or down one by one. The four shift ranges from D-range to L-range are shift ranges of a plurality of types having different gear ratios on the high-speed side (the side of smaller gear ratios) in a variation range where the automatic transmission control of the power transmission device 10 is available; specifically, the high-speed-side gear stages available for the shifting of the automatic transmission 30 is reduced one by one; and although the highest speed gear stage is the O/D gear stage "O/D" in the D-range, the highest speed gear stage is set to the third speed gear stage "3rd" in a 3-range, to the second speed gear stage "2nd" in a 2-range, and to the first speed gear stage "1st" in an L-range. The shift lever 66 is automatically returned to the "M" position from the upshift position "+" and the downshift position "−" by a biasing means such as a spring.

Figure 5:
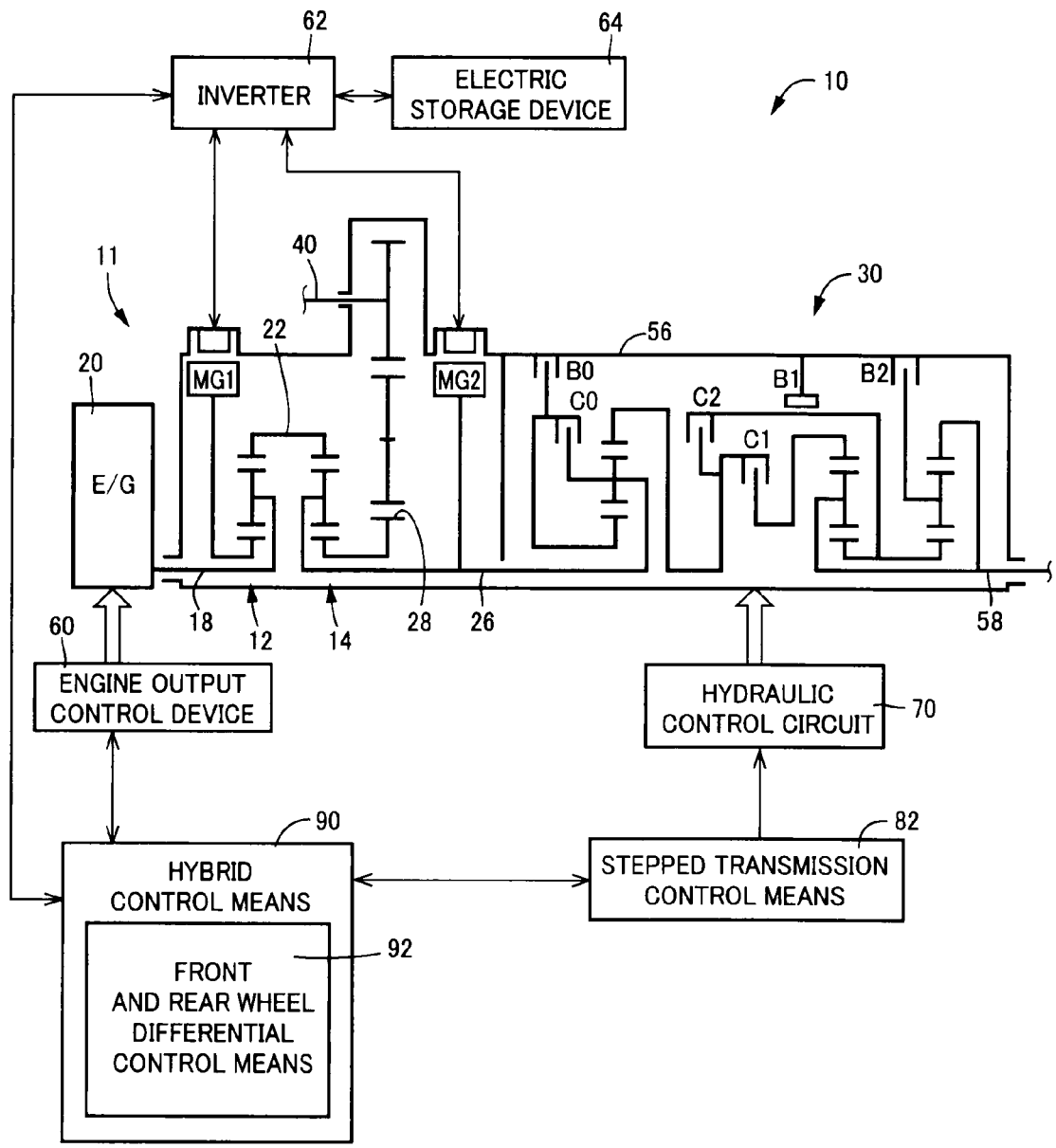
FIG. 5 is a functional block line diagram for explaining a main portion of the control function executed by the electronic control device of FIG. 3.
Figure 6:
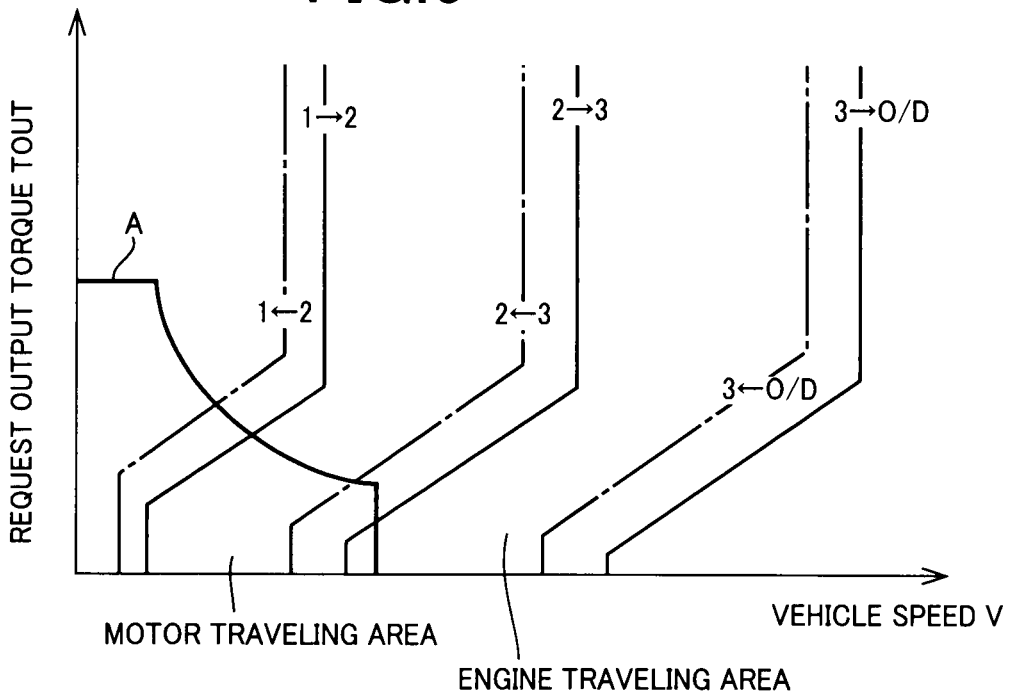
FIG. 6 is an example of a shifting map used with shifting control of the automatic transmission and also depicts an example of a driving power source map used with driving power source switching control switching between engine traveling and motor traveling.

FIG. 5 is a functional block line diagram for explaining a main portion of the control function of the electronic control device 80, and a stepped transmission control means 82 and a hybrid control means 90 are functionally included. The stepped transmission control means 82 determines whether the shift of the automatic transmission 30 should be executed based on the vehicle state indicated by an actual vehicle speed V and a request output torque TOUT in accordance with a preliminarily stored shifting line diagram depicted in FIG. 6, i.e., a relationship (a shifting line diagram, a shifting map) having upshift lines (solid lines) and downshift lines (dashed lines) preliminarily stored using the vehicle speed V and the request output torque TOUT (such as an accelerator operation amount Acc) as parameters, i.e., determines the gear stage to be set by the shift of the automatic transmission 30 and executes the automatic transmission control of the automatic transmission 30 so as to acquire the determined gear stage.

Figures 2A, 2B:
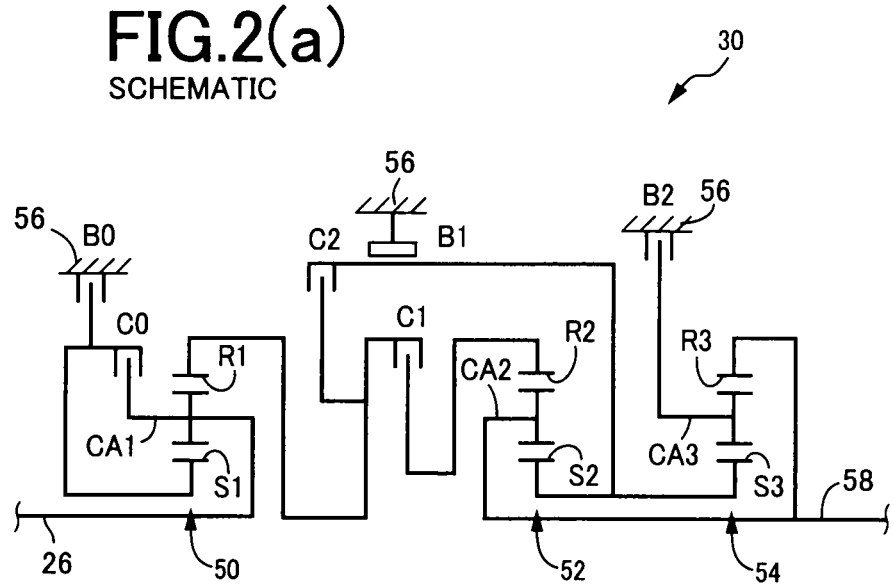
FIG. 2 are diagrams for explaining an example of an automatic transmission provided at the power transmission device of FIG. 1 and (a) is a schematic of the automatic transmission and (b) is an operation table for explaining a friction engagement devices engaged when a plurality of the gear stage of the automatic transmission of FIG. 2(a) is established.

In this case, the stepped transmission control means 82 outputs to the hydraulic control circuit 70 a command (a shift output command, a hydraulic pressure command) for engaging and releasing the hydraulic friction engagement devices (the clutches C and the brakes B) involved in the shift of the automatic transmission 30, i.e., a command for executing the clutch-to-clutch shift by releasing the release-side friction engagement devices involved in the shift of the automatic transmission 30 and by engaging the engagement-side friction engagement devices so as to establish a predetermined gear stage in accordance with an engagement table depicted in FIG. 2(b), for example. The hydraulic control circuit 70 changes the engagement pressure of the hydraulic friction engagement devices involved in the shift with a linear solenoid valve etc., in accordance with a predetermined hydraulic change pattern as instructed by the command to release the release-side friction engagement devices and engage the engagement-side friction engagement devices for executing the shift of the automatic transmission 30.

On the other hand, the hybrid control means 90 drives the engine 20 to operate in an efficient operation range, controls the power distribution between the engine 20 and the second motor generator MG2, and changes a reaction force due to the electric generation by the first motor generator MG1 to the optimum state to control the gear ratio γS of the electric type differential portion 12 acting as an electric stepless transmission. Therefore, for a traveling vehicle speed V at a time point, a target (request) output of a vehicle is calculated from the accelerator operation amount Acc that is an output request amount of a driver and the vehicle speed V, and a necessary total target output is calculated from the target output and a charge request value of the vehicle. A target engine output is then calculated such that the total target output is acquired in consideration of a transmission loss, loads of accessories, an assist torque of the second motor generator MG2, etc., to control the engine 20 and control an amount of the electric generation of the first motor generator MG1 so as to achieve the engine rotation speed NE and the engine torque TE for acquiring the target engine output.

Figure 7:
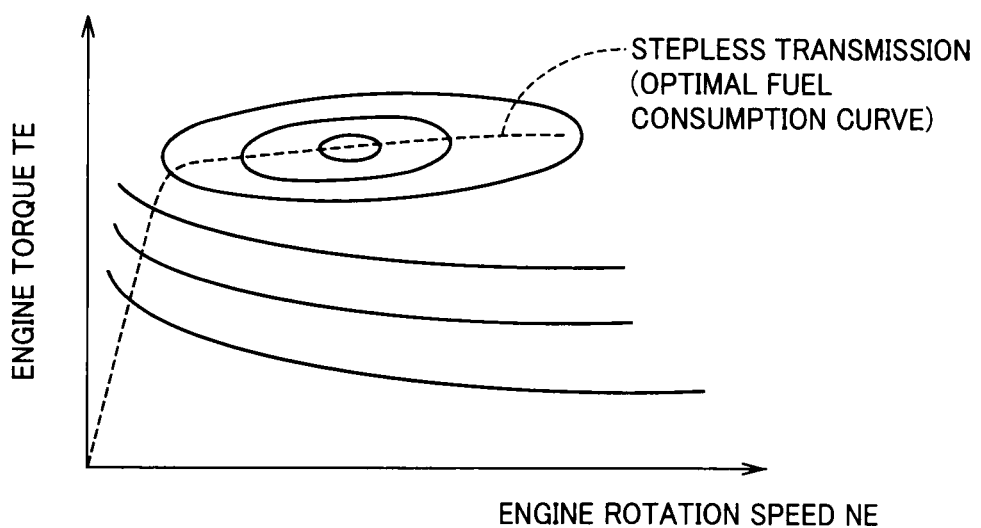
FIG. 7 is an example of a fuel consumption map of the engine that the power transmission device of FIG. 1 includes.

The electric type differential portion 12 is driven to function as an electric stepless transmission to match the engine rotation speed NE determined for operating the engine 20 in an efficient operation range with the rotation speed of the differential output member 22 determined from the vehicle speed V and the shift stages of the automatic transmission 30, i.e., the rotation speed of the ring gear SR. Therefore, the hybrid control means 90 determines a target value of the total gear ratio of the power transmission device 10 depending on the vehicle speed V and controls the gear ratio γS of the electric type differential portion 12 in consideration of the gear stages of the automatic transmission 30 to acquire the target value such that the engine 20 is operated along an optimal fuel consumption curve, based on the optimal fuel consumption curve (fuel consumption map, relationship) of the engine 20 represented by a broken line of FIG. 7 empirically obtained and stored in advance so as to satisfy both the drivability and the fuel consumption property during travelling with stepless transmission in the two-dimensional coordinates made up of the engine rotation speed NE and the output torque (engine torque) TE of the engine 20.

In this case, the hybrid control means 90 supplies the electric energy generated by the first motor generator MG1 to the electric storage device 64 and the second motor generator MG2 via an inverter 62 and, as a result, a main portion of the power of the engine 20 is mechanically transmitted to the differential output member 22 while a portion of the power of the engine 20 is consumed for the electric generation of the first motor generator MG1 and converted into electric energy. The electric energy is supplied through the inverter 62 to the second motor generator MG2 and the second motor generator MG2 is driven to add the torque thereof to the rear-wheel output shaft 26. The equipments related to the electric energy from the generation to the consumption by the second motor generator MG2 make up an electric path from the conversion of a portion of the power of the engine 20 into electric energy to the conversion of the electric energy into mechanical energy. During normal steady traveling, as indicated by a solid line of FIG. 8, the rotation speed NMG1 of the first motor generator MG1 is maintained to substantially zero or is rotated in the positive rotation direction same as the engine rotation direction depending on the vehicle speed V to generate electric energy through the regenerative control and to accept the reaction force when the differential output member 22 (ring gear SR) is rotationally driven in the positive rotation direction by the engine 20.

The hybrid control means 90 controls the first motor generator rotation speed NMG1 with the electric CVT function of the electric type differential portion 12 such that the engine rotation speed NE is maintained substantially constant or controlled at an arbitrary rotation speed regardless of whether a vehicle is stopped or traveling.

The hybrid control means 90 functionally includes an engine output control means that outputs commands separately or in combination to the engine output control device 60 to control opening/closing of the electronic throttle valve with the throttle actuator for throttle control, to control a fuel injection amount and an injection timing of the fuel injection device for the fuel injection control, and to control the timing of the ignition by the ignition device such as an igniter for the ignition timing control, executing the output control of the engine 20 to generate necessary engine output. For example, the throttle actuator is basically driven based on the accelerator operation amount Acc in accordance with a preliminarily stored relationship not depicted to execute the throttle control such that the throttle valve opening degree $\theta_{TH}$ is increased as the accelerator operation amount Acc increases.

The hybrid control means 90 can achieve the motor traveling with the electric CVT function (differential action) of the electric type differential portion 12 regardless of whether the engine 20 is stopped or in the idle state. For example, the engine 20 is stopped or put into the idle state and the motor traveling is performed by using only the second motor generator MG2 as a power source in a relatively lower output torque zone, i.e., a lower engine torque zone generally considered as having poor engine efficiency as compared to a higher torque zone, or in a relatively lower vehicle speed zone of the vehicle speed V, i.e., a lower load zone. For example, in FIG. 6, a predetermined motor traveling area is located on the side closer to the original point than a solid line A, i.e., the lower torque side or the lower vehicle speed side. During the motor traveling, only the rear wheels 34 are driven for the rear-wheel-drive travelling. To suppress the drag of the engine 20 and improve the fuel consumption while the engine 20 is stopped, it is desirable that, for example, the first motor generator MG1 is put into a no-load state and is allowed to idle so as to maintain the engine rotation speed NE at zero or substantially zero with the electric CVT function (differential action) of the electric type differential portion 12. Even in the motor traveling area, the engine 20 is operated as needed at the time of predetermined acceleration etc., for traveling using both the engine 20 and the second motor generator MG2 as the power sources. The engine 20 is put into the operating state as needed for charging of the electric storage device 64, warm-up, etc.

The hybrid control means 90 can perform so-called torque assist for complementing the power of the engine 20, even during engine traveling using the engine 20 as the drive force source, by supplying the electric energy from the first motor generator MG1 and/or the electric energy from the electric storage device 64 through the electric path described above to the second motor generator MG2 and by driving the second motor generator MG2 to apply a torque to the rear wheels 34. For example, at the time of acceleration traveling or on a climbing road when the accelerator pedal is deeply depressed, the second motor generator MG2 is subjected to the power running control to perform the torque assist. Although the engine traveling area for performing the engine traveling is located on the outside of the solid line A in FIG. 6, i.e., the higher torque side or the higher vehicle speed side, the torque assist by the second motor generator MG2 is performed as needed. The entire area may be defined as the engine traveling area without providing the motor traveling area indicated by the solid line A of FIG. 6 to perform the torque assist by the second motor generator MG2 with the electric energy acquired through the regenerative control of the first motor generator MG1.

The hybrid control means 90 can allow the first motor generator MG1 to freely rotate, i.e., idle in the no-load state to achieve the state in which the electric type differential portion 12 is unable to transmit a torque, i.e., the state equivalent to the state with the power transmission path interrupted in the electric type differential portion 12, in which the output from the power generation device 11 is not generated. Therefore, the hybrid control means 90 can put the first motor generator MG1 into the no-load state to put the electric type differential portion 12 into the neutral state (neutral state) with the power transmission path electrically interrupted.

The hybrid control means 90 has a function as a regenerative control means that operates the second motor generator MG2 as an electric generator through the regenerative control thereof when the second motor generator MG2 is rotationally driven by kinetic energy of a vehicle, i.e., a reverse drive force input from the rear wheels 34 and that charges the electric storage device 64 through the inverter 62 with the electric energy to improve the fuel consumption during the inertia traveling (during coasting) when the acceleration is turned off and at the time of braking by the foot brake. This regenerative control is controlled to achieve a regenerative amount determined based on a charging capacity SOC of the electric storage device 64 and the braking force distribution of a braking force from a hydraulics brake for acquiring a braking force corresponding to a brake pedal operation amount.

On the other hand, the power transmission device 10 of a front and rear wheel drive vehicle of this embodiment is configured such that an input rotating element, a first output rotating element, and a second output rotating element are arranged in series from one end to the other end on the collinear diagram of FIG. 8 capable of representing the rotation speeds of the three rotating elements (CS, CCA, CR) of the front and rear wheel power distribution device 14 on a straight line. Specifically, the ring gear CR of the single pinion type distribution planetary gear device 24 is the input rotating element and is coupled to the differential output member 22; the carrier CCA is the first output rotating element and is coupled to the rear-wheel output shaft 26; and the sun gear CS is the second output rotating element and is coupled to the front-wheel output gear 28. Therefore, a rotation speed Ncr of the ring gear CR, i.e., the input rotating element limits differential rotation between a rotation speed Ncca of the carrier CCA that is the first output rotating element and a rotation speed Ncs of the sun gear CS that is the second output rotating element and further limits differential rotation between the rear wheel 34 and the front wheel 44 coupled thereto.

In other words, the rotation speeds Ncca, Ncs of the first output rotating element (carrier CCA) and the second output rotating element (sun gear CS) are limited such that the rotation speeds Ncca, Ncs of the first output rotating element (carrier CCA) and the second output rotating element (sun gear CS) are linked in a straight line relative to the rotation speed Ncr of the input rotating element (ring gear CR) located at one end of the collinear diagram. Therefore, by controlling the rotation speed Ncr of the input rotating element (ring gear CR) through the rotation speed control of the first motor generator MG1 of the power generation device 11, the differential rotation between the first output rotating element (carrier CCA) and the second output rotating element (sun gear CS) can be limited and can be put into a predetermined differential state at the time of turning. The rotation speed control of the first motor generator MG1 is performed by feedback control such that the actual first motor generator rotation speed NMG1 is set to a predetermined target rotation speed.

For example, by controlling the torque (regenerative torque) of the first motor generator MG1 when the rotation speed NMG1 of the first motor generator MG1 is controlled, the variability of the rotation speed Ncr of the input rotating element (ring gear CR) can be controlled and, therefore, the differential motion of the front and rear wheels can be limited or allowed. If the torque of the first motor generator MG1 is increased to limit a rotation speed change of the input rotating element (ring gear CR), the differential rotation is limited between the first output rotating element (carrier CCA) and the second output rotating element (sun gear CS) and, in turn, the differential rotation is limited between the rear wheel 34 and the front wheel 44 coupled thereto. If the torque of the first motor generator MG1 is reduced to allow a rotation speed change of the input rotating element (ring gear CR), the differential rotation is allowed between the first output rotating element (carrier CCA) and the second output rotating element (sun gear CS) and, in turn, the differential rotation is allowed between the rear wheel 34 and the front wheel 44 coupled thereto.

A specific example of such differential control of front and rear wheels will hereinafter be described.

As depicted in the functional block line diagram of FIG. 5, the hybrid control means 90 functionally includes a front and rear wheel differential control means 92 for controlling the differential motion between the front and rear wheels. Based on a vehicle traveling state, the front and rear wheel differential control means 92 limits the differential rotation between the carrier CCA that is the first output rotating element and the sun gear CS that is the second output rotating element during straight travel and calculates the operational point of the first motor generator MG1 that allows the differential rotation between the carrier CCA and the sun gear CS during turning travel, i.e., a differential allowable target rotation speed NMG1def in this case, to control the first motor generator MG1 such that the operation at the differential allowable target rotation speed NMG1def is achieved, and the front and rear wheel differential control means 92 specifically executes signal processes in accordance with a flowchart of FIG. 9.

The rotation speed Ncca of the carrier CCA and the rotation speed Ncs of the sun gear CS are determined depending on the gear ratio $\gamma r$ from the front and rear wheel power distribution device 14 to the rear wheel 34, the gear ratio $\gamma f$ to the front wheel 44, and the vehicle speed V (average wheel rotation speed) and can be expressed as the rotation speeds Ncca=V×$\gamma r$ and Ncs=V×$\gamma f$. Since the rear-wheel gear ratio $\gamma r$ is a value $\gamma T \times ir$ obtained by multiplying the gear ratio $\gamma T$ of the automatic transmission 30 by the differential ratio ir; the front-wheel gear ratio $\gamma f$ is the differential ratio if and ir=if is satisfied, Ncca=Ncs is satisfied when the gear ratio $\gamma T$ is 1, i.e., in the case of the third speed gear stage "3rd", and Ncca<Ncs is satisfied as depicted in FIG. 8 in the case of the O/D gear stage "O/D" having the gear ratio $\gamma T$ smaller than 1 while Ncca>Ncs is satisfied in the case of the first speed gear stage "1st" or the second speed gear stage "2nd" having the gear ratio $\gamma T$ greater than 1. The rotation speeds Ncca=V×$\gamma r$ and Ncs=V×$\gamma f$ determined depending on the vehicle speed V, the rear-wheel gear ratio $\gamma r$, and the front-wheel gear ratio $\gamma f$ are reference rotation speeds when no differential motion is generated and do not cause the differential state even when the speeds are different from each other, and the differential state is caused when the rotation speeds Ncca, Ncs are deviated from the reference rotation speeds (Ncca=V×$\gamma r$, Ncs=V×$\gamma f$) in association with a difference in turn trajectory between the front and rear wheels during turning travel. The front and rear wheel differential control means 92 allows or limits such differential motion. If the radial dimensions of the front and rear wheels are different, the rotation speeds Ncca, Ncs are obtained in consideration of the difference in radial dimension.

Figure 9:
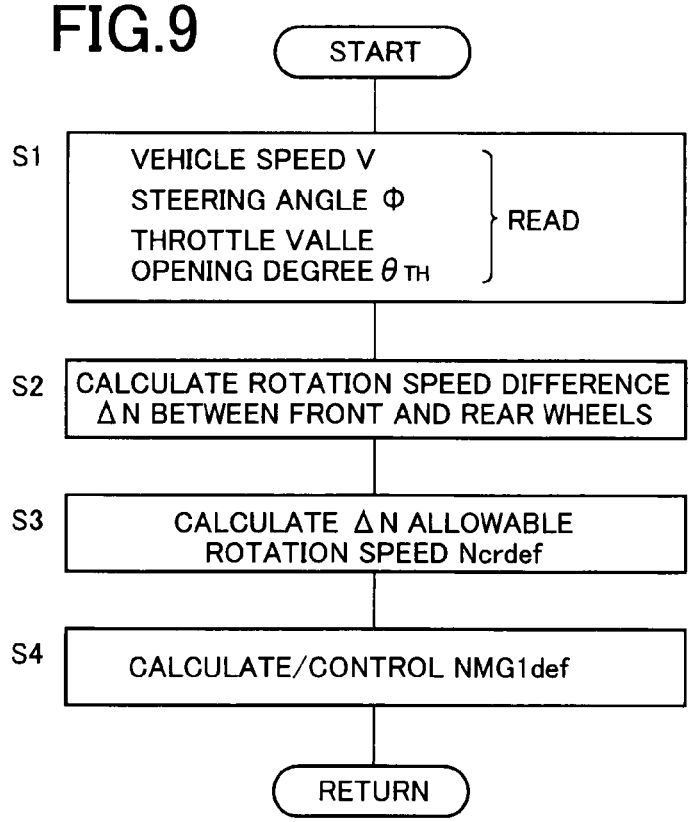
FIG. 9 is a flowchart for especially explaining the content of the differential control executed by the front and rear wheel differential control means of FIG. 5.
Figure 10A:
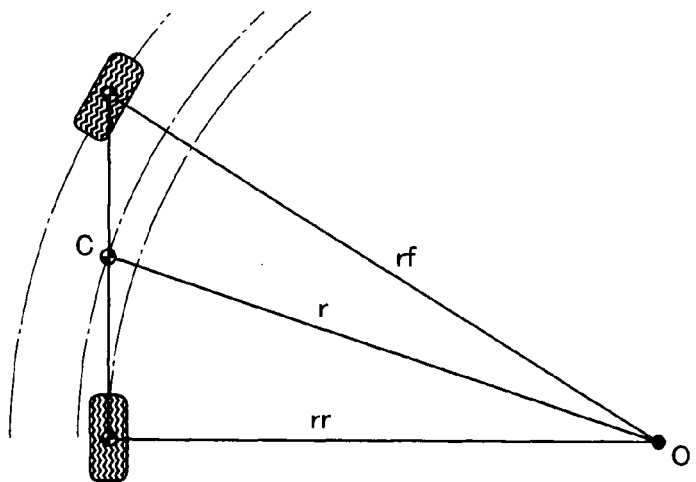
FIG. 10 are diagrams for explaining the difference in turn trajectory of the front and rear wheels during the turning travel and (a) is the time of low-speed turning travel, (b) is the time of high-speed turning travel, and (c) depicts an example of change property of a slip angle.
Figure 10B:
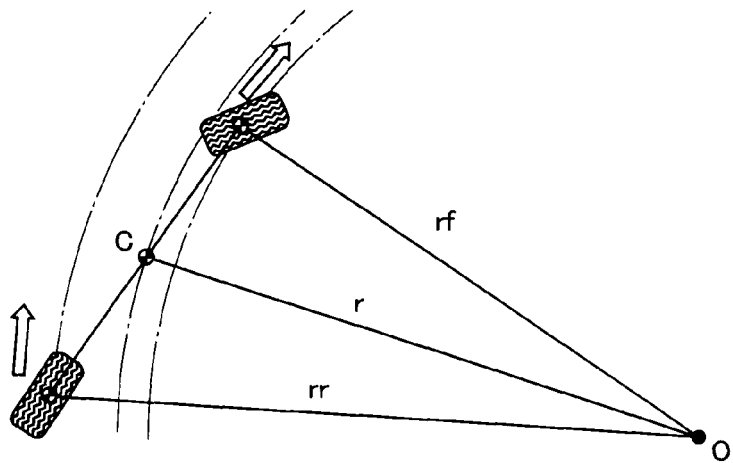

At step S1 of FIG. 9, the vehicle speed V, the steering angle $\Phi$, throttle valve opening degree $\theta_{TH}$, etc., are read as parameters representative of a vehicle traveling state affecting the differential motion of the front and rear wheels and, at step S2, a rotation speed difference $\Delta N$ between the front and rear wheels is calculated (predicted) based on these parameters. The rotation speed difference $\Delta N$ is generated due to a difference in turn trajectory when the turn trajectories of the front wheel 44 and the rear wheel 34 are different as depicted in FIGS. 10(a) and 10(b) and can basically be obtained from the turn trajectories. The rotation speed difference $\Delta N$ can be obtained from various conventionally known calculating methods; however, since the turn trajectories of the front wheel 44 and the rear wheel 34 are varied depending on the vehicle speed V as depicted in FIGS. 10(a) and 10(b), it is desirable to obtain a different algorithm depending on the vehicle speed V. For example, at the time of low-speed turning travel as depicted in FIG. 10(a), a turn trajectory can geometrically be obtained based on the steering angle $\Phi$ and specifications (such as wheelbase) of vehicle and the wheels 44, 34 roll and rotate along the turn trajectory. In the case of such a low-speed turn, a turn trajectory radius rf of the front wheel 44 is greater than a turn trajectory radius rr of the rear wheel 34. The rotation speed difference $\Delta N$ can be calculated by obtaining the movement distances and rotation speeds of the wheels 44, 34 on the assumption that a gravity point C moves along a circular arc of a radius r at an angular speed determined depending on the vehicle speed V, for example. Therefore, the rotation speed difference $\Delta N$ can be calculated from a predetermined arithmetic expression or data map using the steering angle $\Phi$ and the vehicle speed V as parameters.

Figure 10C:
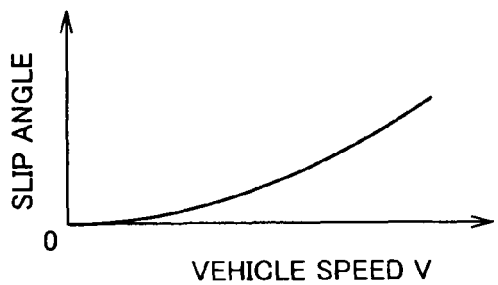

In the case of high-speed turning travel as depicted in FIG. 10(b), a turn trajectory is determined by balance between a cornering force and a centrifugal force of the front and rear wheels, and a deviation (slip angle) is generated between the rolling rotation direction and the turn trajectory of the wheels 44, 34. This deviation, i.e., slip angle increases as the vehicle speed V increases as depicted in FIG. 10(c) and when the slip angle increases, the turn trajectory radius rr of the rear wheel 34 becomes greater than the turn trajectory radius rf of the front wheel 44. Although FIG. 10(b) depicts the case that the turn trajectory radius n of the rear wheel 34 is greater than the turn trajectory radius rf of the front wheel 44, the turn trajectory radius rr of the rear wheel 34 becomes smaller than the turn trajectory radius rf of the front wheel 44 as is the case with FIG. 10(a) depending on the vehicle speed V. Since a cornering force is determined by the steering angle $\Phi$, the vehicle speed V, output of a power source, i.e., the throttle valve opening degree $\theta_{TH}$, the yaw rate Y, specifications of a vehicle such as wheelbase, etc., and the turn trajectory can be obtained based on the cornering force, the rotation speed difference $\Delta N$ can be calculated by obtaining the movement distances and rotation speeds of the wheels 44, 34 in consideration of the slip angle on the assumption that the gravity point C moves along a circular arc of a radius r at an angular speed determined depending on the vehicle speed V, for example. Therefore, the rotation speed difference $\Delta N$ can be calculated from a predetermined arithmetic expression or data map using the steering angle $\Phi$, the vehicle speed V, the throttle valve opening degree $\theta_{TH}$, etc., as parameters. The rotation speed difference $\Delta N$ can more finely and accurately be obtained in consideration of additional parameters affecting the front and rear wheel differential motion, such as a vehicle weight and a friction coefficient $\mu$ of road surface.

Figure 11:
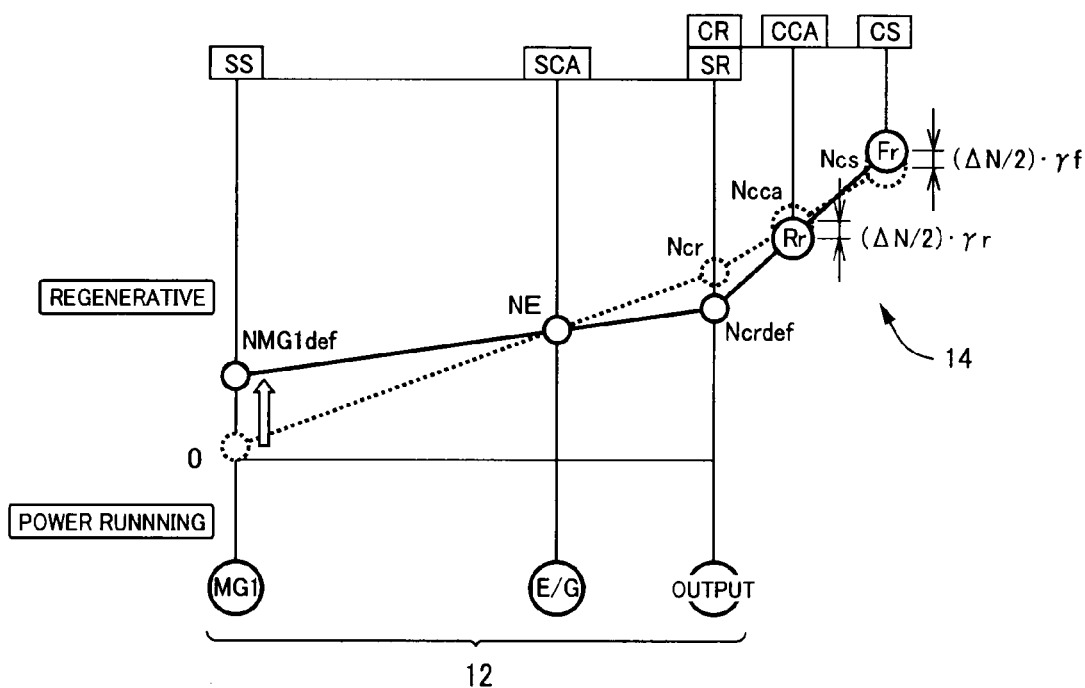
FIG. 11 is a diagram that depicts the rotation speed of the portions when the differential control is performed in accordance with the flowchart of FIG. 9 at the time of the turning travel and a diagram corresponds to FIG. 8.

At step S3, a rotation speed Ncrdef of the input rotating element (ring gear CR) allowing the front and rear wheel differential motion at the rotation speed difference $\Delta N$ is calculated in accordance with Equation (1) defined by using the gear ratio $\rho C$ of the distribution planetary gear device 24, the front-wheel gear ratio $\gamma f$, and the rear-wheel gear ratio $\gamma r$. Equation (1) is a basic equation representative of a relationship among rotation speeds of three rotating elements of a single pinion type planetary gear device and corresponds to the case that the rotation speed difference $\Delta N$ is changed by half at each of front and rear wheels. A solid line of collinear diagram depicted in FIG. 11 represents the case that the turn trajectory radius rr of the rear wheel 34 becomes smaller than the turn trajectory radius rf of the front wheel 44 at the time of turning travel and that a rotation speed Nf of the front wheel 44 is increased by $\Delta N/2$ while a rotation speed Nr of the rear wheel 34 is reduced by $\Delta N/2$ when the automatic transmission 30 is set to the O/D gear stage "O/D"; the gear ratio $\gamma T$ is smaller than 1; and $\gamma r < \gamma f$ and Ncr<Ncca<Ncs are satisfied (broken line). For example, instead of obtaining the rotation speed difference $\Delta N$ at step S2, rotation speed change amounts $\Delta Nf$, $\Delta Nr$ due to differential motion may separately be obtained for the front wheel 44 and the rear wheel 34 or rotation speeds Nfdef, Nrdef may directly be calculated for the front wheel 44 and the rear wheel 34 after differential motion occurs to obtain the rotation speed Ncrdef of the ring gear CR allowing the front and rear wheel differential motion in accordance with the arithmetic expression same as Equation (1), and various other techniques can be employed.

$$Ncrdef=\{Ncca-(\Delta N/2) \cdot \gamma r\} \cdot (1+\rho C)-(Ncs+(\Delta N/2) \cdot \gamma f) \cdot \rho C \qquad (1)$$

At next step S4, the gear ratio $\rho S$ of the differential planetary gear device 16 is used for calculating a differential allowable target rotation speed NMG1def of the first motor generator MG1 causing the rotation speed Ncr of the input rotating element (ring gear CR) to be a $\Delta N$ allowable rotation speed Ncrdef that allows the rotation speed difference $\Delta N$ without changing the engine rotation speed NE in accordance with Equation (2). Equation (2) is a basic equation representative of a relationship among rotation speeds of three rotating elements of a single pinion type planetary gear device as is the case with Equation (1) described above and Equation (2) is acquired because the rotation speed Nsr of the ring gear SR of the differential planetary gear device 16 is Ncrdef and the rotation speed Nsca of the carrier SCA is NE. The first motor generator MG1 is controlled by feedback control or feedforward control such that the rotation speed NMG1 of the first motor generator MG1 is set to the differential allowable target rotation speed NMG1def.

$$NMG1def=Nsca \cdot (1+\rho S)-Nsr=NE \cdot (1+\rho S)-Ncrdef \qquad (2)$$

As a result, the rotation speed Ncr of the ring gear CR, i.e., the input rotating element of the distribution planetary gear device 24 is set to the $\Delta N$ allowable rotation speed Ncrdef to allow the differential rotation of the front and rear wheel with the rotation speed Nf of the front wheel 44 changed by $\Delta N/2$ from the reference rotation speed corresponding to the vehicle speed V and the rotation speed Nr of the rear wheel 34 changed by $-\Delta N/2$ from the reference rotation speed corresponding to the vehicle speed V, and smooth turning performance is acquired in accordance with the vehicle traveling state such as the vehicle speed V, the steering angle $\Phi$, and the throttle valve opening degree $\theta_{TH}$. FIG. 11 depicts the case that the turn trajectory radius rr of the rear wheel 34 becomes smaller than the turn trajectory radius rf of the front wheel 44 at the time of turning travel, and the rotation speed NMG1 of the first motor generator MG1 is increased to allow the rotation speed Nf of the front wheel 44 to increase by ΔN/2 and the rotation speed Nr of the rear wheel 34 to decrease by ΔN/2. Conversely, if the turn trajectory radius n of the rear wheel 34 becomes greater than the turn trajectory radius rf of the front wheel 44 at the time of turning travel as depicted in FIG. 10(b), the rotation speed NMG1 of the first motor generator MG1 is reduced to allow the rotation speed Nf of the front wheel 44 to decrease by ΔN/2 and the rotation speed Nr of the rear wheel 34 to increase by ΔN/2, and the power funning control is performed in the inverse rotation direction as needed.

If the rotation speed difference ΔN is substantially zero, a change in the rotation speed Ncr of the input rotating element (ring gear CR) is limited and, therefore, the front and rear wheel differential motion is suppressed during straight traveling, thereby ensuring excellent straight traveling stability.

Figure 12:
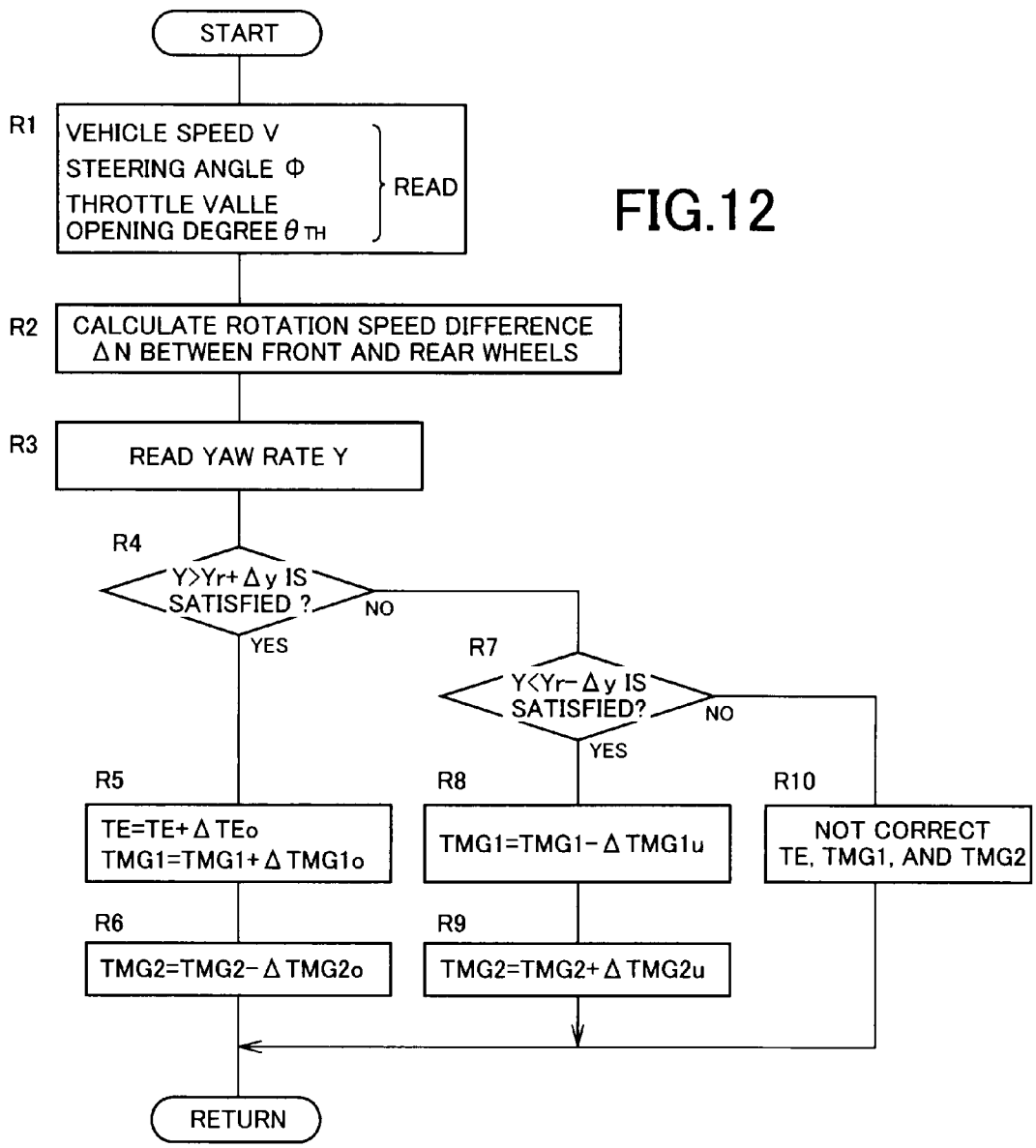
FIG. 12 is a flowchart for explaining another example of the differential control performed by the front and rear wheel differential control means.

FIG. 12 is a flowchart for explaining another example of the front and rear wheel differential control performed by the front and rear wheel differential control means 92 and, in this example, increase/decrease in a torque TMG1 of the first motor generator MG1 is corrected based on the actual yaw rate Y to limit the differential motion such that oversteer is suppressed or allow the differential motion such that understeer is suppressed, and increase/decrease in a torque TMG2 of the second motor generator MG2, i.e., a sub-power source is corrected to prevent a drive force of a vehicle from changing due to the increase/decrease correction of the torque TMG1 of the first motor generator MG1. If the torque TMG1 of the first motor generator MG1 is increased to suppress oversteer, the engine torque is incrementally corrected to prevent the engine rotation speed NE from decreasing instead.

Figure 13:
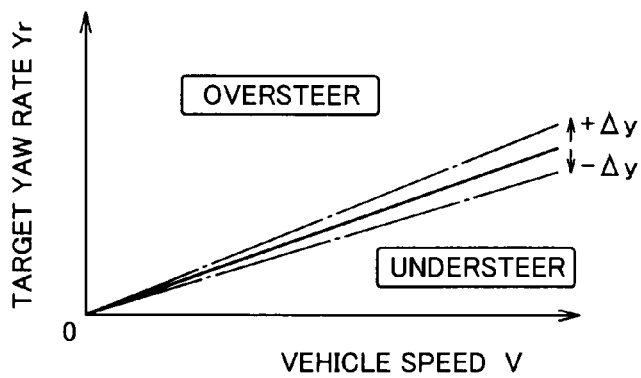
FIG. 13 is a diagram that depicts an example of a target yaw rate Yr used at step R4 of FIG. 12.

Specifically describing with reference to the flowchart of FIG. 12, at steps R1 and R2, the vehicle speed V etc., are read and the rotation speed difference ΔN between the front and rear wheels is calculated based on the vehicle speed V etc., as is the case with steps S1 and S2 of FIG. 9 described above. At step R3, the actual yaw rate Y detected by a yaw rate sensor is read and, at step R4, it is determined whether the yaw rate Y is greater than a determination value (Yr+Δy) obtained by adding an allowable deviation Δy to a predetermined target yaw rate Yr, in other words, whether oversteer tendency or not. The target yaw rate Yr is an optimum value for acquiring suitable turning performance, is determined in advance based on the vehicle traveling state such as the vehicle speed V, the steering angle Φ, the throttle valve opening degree θ$_{TH}$, and the rotation speed difference ΔN obtained at step R2 and vehicle specifications such as wheelbase, and is set by a data map etc., using these as parameters. FIG. 13 is a diagram of a relationship between the target yaw rate Yr and the vehicle speed V under a predetermined condition and the target yaw rate Yr increases in proportion to the vehicle speed V. The target yaw rate Yr can more finely be set in consideration of additional parameters such as a vehicle weight and a lateral acceleration. The allowable deviation Δy is for the purpose of preventing frequent switching between the differential control for oversteer from step R5 and the differential control for understeer from step R8 and may be defined as a constant value; however, in this embodiment, the allowable deviation Δy is defined as a value increased as the vehicle speed V increases, i.e., as the target yaw rate Yr increases, as depicted in FIG. 13.

If the determination at step R4 is YES (positive), i.e., in the case of oversteer tendency indicated by Y>Yr+Δy, steps R5 and later are subsequently executed. At step R5, to limit the differential motion between front and rear wheels so as to suppress oversteer, the first motor generator MG1 and the engine 20 are controlled to increase output such that a rotation speed change of the input rotating element (ring gear CR) is suppressed. Therefore, if the rotation speed Ncr of the input rotating element (ring gear CR) is reduced, for example, as indicated by a solid line of FIG. 11 due to oversteer, the torque TMG1 is incrementally corrected by a predetermined correction amount ΔTMG1o when the rotation speed control of the first motor generator MG1 is performed such that a rotation speed change of the first motor generator MG1 is suppressed to prevent this reduction, and the torque TE of the engine 20 is incrementally corrected by a predetermined correction amount ΔTEo to prevent the engine rotation speed NE from decreasing instead. Specifically, the throttle valve opening degree θ$_{TH}$ is increased. The correction amounts ΔTMG1o and ΔTEo may be defined as constant values or may be set by arithmetic expression, data map, etc., depending on a deviation between the actual yaw rate Y and the target yaw rate Yr such that the correction amounts ΔTMG1o and ΔTEo are increased as the deviation increases.

Since a drive force of a vehicle is increased when the first motor generator MG1 and the engine 20 are controlled to increase output at step R5, the torque TMG2 of the second motor generator MG2 is reduced by a correction amount ΔTMG2o at next step R6 so as to cancel this change in drive force. The correction amount ΔTMG2o is set depending on the correction amounts ΔTMG1o and ΔTEo.

If the determination at step R4 is NO (negative), i.e., in the case of no oversteer tendency indicated by Y>Yr+Δy, it is determined at step R7 whether the yaw rate Y is smaller than a determination value (Yr−Δy) obtained by subtracting an allowable deviation Δy from the predetermined target yaw rate Yr, in other words, whether understeer tendency or not. The allowable deviation Δy in this case may be the same value as that in the case of the oversteer determination or may be set as a different value. In the case of understeer tendency indicated by Y<Yr−Δy, steps R8 and later are subsequently executed. At step R8, to allow the differential motion between front and rear wheels so as to suppress understeer, the first motor generator MG1 is controlled to reduce output such that a rotation speed change of the input rotating element (ring gear CR) is allowed. Therefore, if the rotation speed Ncr of the input rotating element (ring gear CR) is allowed to decrease as indicated by a solid line of FIG. 11 to suppress understeer, the torque TMG1 is reduced and corrected by a predetermined correction amount ΔTMG1u when the rotation speed control of the first motor generator MG1 is performed such that the rotation speed NMG1 of the first motor generator MG1 is easily changed. The correction amount ΔTMG1u may be defined as a constant value or may be set by arithmetic expression, data map, etc., depending on a deviation between the actual yaw rate Y and the target yaw rate Yr such that the correction amount ΔTMG1u is increased as the deviation increases. At step R8, a load of the engine 20 is not increased and, therefore, it is not necessary to incrementally correct the torque TE of the engine 20 as in the case of step R5.

Since a drive force of a vehicle is reduced when the first motor generator MG1 is controlled to reduce output at step R8, the torque TMG2 of the second motor generator MG2 is increased by a correction amount ΔTMG2u at next step R9 so as to cancel this change in drive force. The correction amount ΔTMG2u is set depending on the correction amount ΔTMG1u.

If the determination at step R7 is NO (negative), i.e., in the case of neither oversteer nor understeer tendency and the yaw rate Y within a range of Yr−Δy≦Y≦Yr+Δy, step R10 is executed. In this case, since the current actual yaw rate Y is close to the target yaw rate Yr and suitable turning performance is expected, the current output control is maintained without additionally correcting the front and rear wheel differential control in terms of the output control of the engine 20, the first motor generator MG1, and the second motor generator MG2.

Since the power transmission device 10 of a front and rear wheel drive vehicle of this embodiment can control an operation state of the first motor generator MG1, i.e., the rotation speed NMG1, for example, as in the flowchart of FIG. 9 and control the torque TMG1 of the first motor generator MG1 as in the flowchart of FIG. 12 to limit or allow the differential rotation of the first output rotating element (carrier CCA) and the second rotating element (sun gear CS), it is not necessary to separately provide a mechanical differential control means such as a clutch or a disc spring and the device is simply and inexpensively configured.

Since the power transmission device 10 of this embodiment has the electric type differential portion 12, and the rotation speed of the differential output member 22, i.e., the rotation speed Ncr of the input rotating element (ring gear CR) of the front and rear wheel power distribution device 14 is determined by the rotation speeds NMG1 and NE of both the first motor generator MG1 and the engine 20, the rotation speed Ncr can be controlled by the rotation speed control of the first motor generator MG1 as depicted in the flowchart of FIG. 9 to limit the differential rotation of front and rear wheels or achieve a predetermined differential state. As depicted in the flowchart of FIG. 12, the torque control of the first motor generator MG1 can be performed to limit the differential rotation of front and rear wheels or allow the differential motion. In this case, for example, when an inverse input torque from the wheels 34, 44 is abruptly changed, a load torque can be absorbed by a rotation speed change of the engine 20 to prevent an excessive load from acting on the first motor generator MG1 and other rotating elements.

Since the front and rear wheel differential control of the flowchart of FIG. 9 includes calculating an operational point of the first motor generator MG1 at which the first output rotating element (carrier CCA) and the second output rotating element (sun gear CS) are put into a predetermined differential state, i.e., the differential allowable target rotation speed NMG1def, based on the vehicle traveling state such as the vehicle speed V, the steering angle Φ, and the throttle valve opening degree $\theta_{TH}$, and the first motor generator MG1 is controlled to operate at the differential allowable target rotation speed NMG1def, the differential rotation can be allowed during turning etc., while limiting the differential rotation during straight travel, to prevent a tight corner brake phenomenon from occurring or to suppress understeer.

In the front and rear wheel differential control of the flowchart of FIG. 12, if oversteer tendency is determined, the torque TMG1 is incrementally corrected at step R5 to suppress a rotation speed change of the first motor generator MG1 and the torque TE of the engine 20 is incrementally corrected to suppress a change in the rotation speed of the differential input shaft 18, i.e., the engine rotation speed NE so as to limit the differential motion of the first output rotating element (carrier CCA) and the second output rotating element (sun gear CS) relative to each other and, therefore, the oversteer during turning travel is suitably suppressed that is caused by increase in the differential motion of the first output rotating element (carrier CCA) and the second output rotating element (sun gear CS).

In the front and rear wheel differential control of the flowchart of FIG. 12, the torque correction control of the second motor generator MG2 is performed at step R6 or R9 so as to prevent a drive force of a vehicle from changing due to the torque correction control of the first motor generator MG1 or the torque correction control of the engine 20 at step R5 or R8 and, therefore, a change in the drive force of the vehicle is suitably suppressed that is caused by the differential control for limiting or allowing the front and rear wheel differential motion.

Other embodiments of the present invention will then be described. In the following embodiments, the portions common to the embodiment described above are denoted by the same reference numerals and will not be described in detail.

Figure 14A:
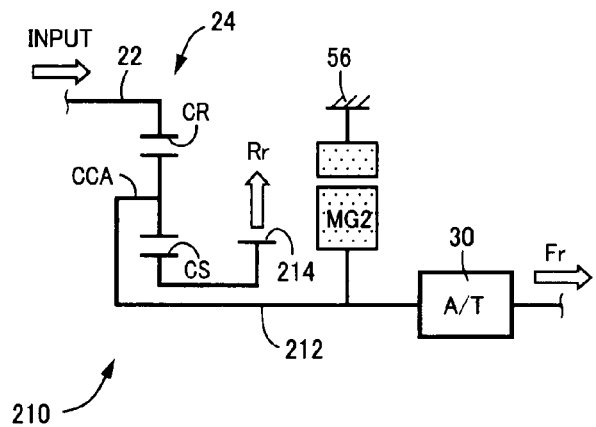
FIG. 14 are schematics for explaining other embodiments of the present invention, and (a) is the case applied to a front and rear wheel drive vehicle based on a traverse type front wheel drive vehicle and (b) is the case that the coupling mode of a differential planetary gear device is different.
Figure 14B:
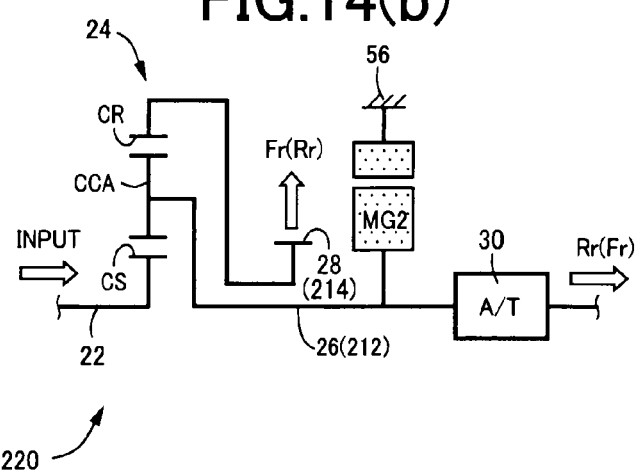

FIGS. 14(a) and 14(b) are schematics for explaining other examples of the front and rear wheel power distribution device 14. A front and rear wheel power distribution device 210 of FIG. 14(a) corresponds to the case of a front and rear wheel drive vehicle based on a transverse type front wheel drive vehicle and, although the ring gear CR of the differential planetary gear device 24 is the input rotating element and is coupled to the differential output member 22 in the same way, the carrier CCA acting as the first output rotating element is coupled to a front-wheel output shaft 212; the front-wheel output shaft 212 is provided with the second motor generator MG2 and the automatic transmission 30; and the sun gear CS acting as the second output rotating element is coupled to a rear-wheel output gear 214. A bevel gear can be used as the rear-wheel output gear 214 and can directly be coupled to a propeller shaft, etc. In this case, substantially the same operational effect as the embodiment can be acquired except that the front and rear wheels are different.

In a front and rear wheel power distribution device 220 of FIG. 14(b), the sun gear CS of the differential planetary gear device 24 is the input rotating element and is coupled to the differential output member 22; the carrier CCA is the first output rotating element and is coupled to the rear-wheel output shaft 26; and the ring gear CR is the second output rotating element and is coupled to the front-wheel output gear 28. In this case, the same operational effect as the embodiment can be acquired. The front and rear wheel power distribution device 220 is also applicable to a front and rear wheel drive vehicle based on a transverse type front wheel drive vehicle as is the case with FIG. 14(a) and, as depicted in parentheses, the carrier CCA acting as the first output rotating element may be coupled to the front-wheel output shaft 212 and the ring gear CR acting as the second output rotating element may be coupled to the rear-wheel output gear 214.

Figure 15A:
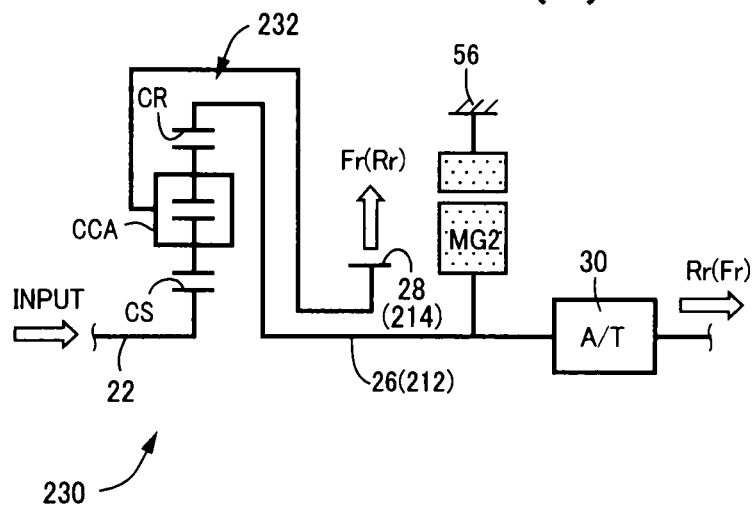
FIG. 15 are schematics for explaining other embodiments of the present invention, which are schematics for explaining two kinds of examples that a double pinion type distribution planetary gear device is used as the differential mechanical of the front and rear wheel power distribution device.
Figure 15B:
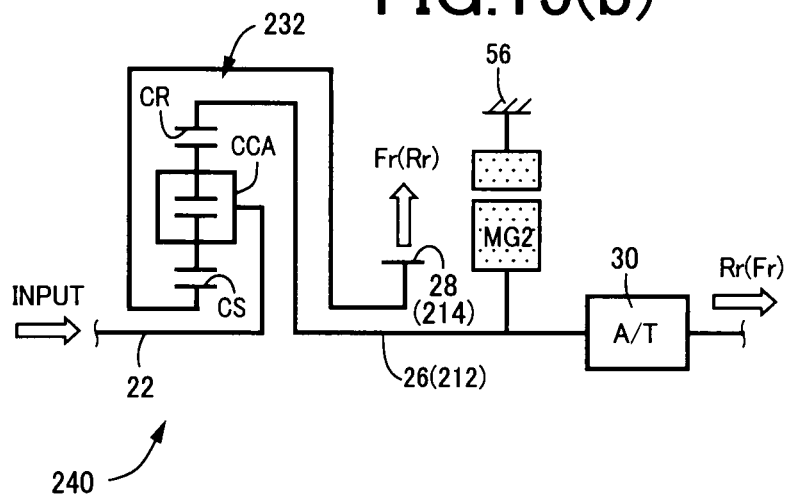

FIGS. 15(a) and 15(b) are schematics for explaining other examples of the front and rear wheel power distribution device 14 and a double pinion type distribution planetary gear device 232 is used instead of the distribution planetary gear device 24. In a front and rear wheel power distribution device 230 of FIG. 15(a), the sun gear CS of the distribution planetary gear device 232 is the input rotating element and is coupled to the differential output member 22; the ring gear CR is the first output rotating element and is coupled to the rear-wheel output shaft 26; and the carrier CCA is the second output rotating element and is coupled to the front-wheel output gear 28. In this case, the same operational effect as the embodiment can be acquired. The front and rear wheel power distribution device 230 is also applicable to a front and rear wheel drive vehicle based on a transverse type front wheel drive vehicle and, as depicted in parentheses, the ring gear CR acting as the first output rotating element may be coupled to the front-wheel output shaft 212 and the carrier CCA acting as the second output rotating element may be coupled to the rear-wheel output gear 214.

In a front and rear wheel power distribution device 240 of FIG. 15(b), the carrier CCA of the distribution planetary gear device 232 is the input rotating element and is coupled to the differential output member 22; the ring gear CR is the first output rotating element and is coupled to the rear-wheel output shaft 26; and the sun gear CS is the second output rotating element and is coupled to the front-wheel output gear 28. In this case, the same operational effect as the embodiment can be acquired. The front and rear wheel power distribution device 240 is also applicable to a front and rear wheel drive vehicle based on a transverse type front wheel drive vehicle and, as depicted in parentheses, the ring gear CR acting as the first output rotating element may be coupled to the front-wheel output shaft 212 and the sun gear CS acting as the second output rotating element may be coupled to the rear-wheel output gear 214.

Figure 16:
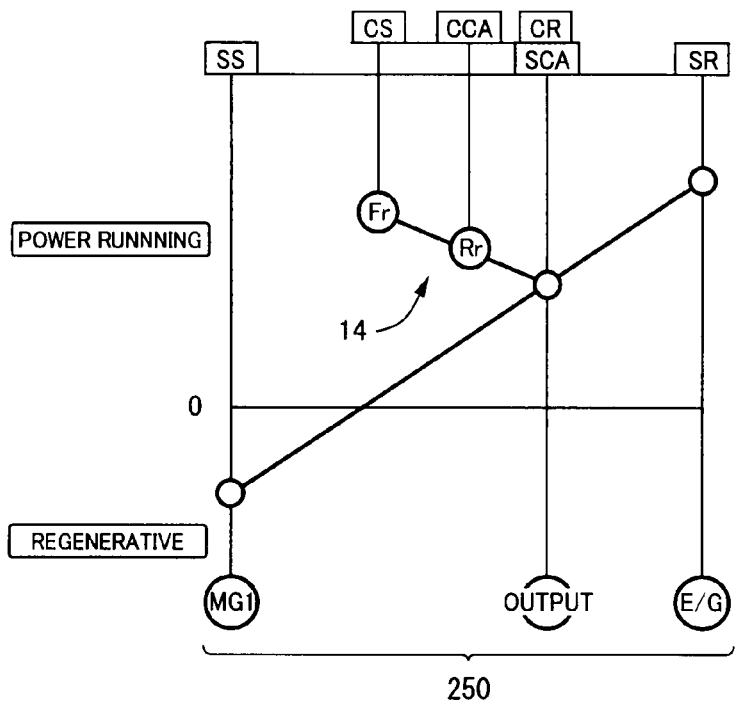
FIG. 16 is a diagram for explaining other embodiments of the present invention, which is a diagram that corresponds to FIG. 8 and the case that the differential output member is coupled to the carrier SCA located in the middle on the collinear diagram.

FIG. 16 is a collinear diagram for explaining another example of the electric type differential portion 12 and, in the case of an electric type differential portion 250, although the first motor generator MG1 is coupled to the sun gear SS of the differential planetary gear device 16 in the same way, the carrier SCA located in the middle on the collinear diagram is coupled to the differential output member 22 and the ring gear SR is coupled to the differential input shaft 18 and connected to the engine 20. In this case, while the first motor generator MG1 is rotated in the reverse direction, the regenerative control is performed to cause a regenerative torque to act on the sun gear SS such that a reaction force is received and the carrier SCA outputs power.

Figure 17:
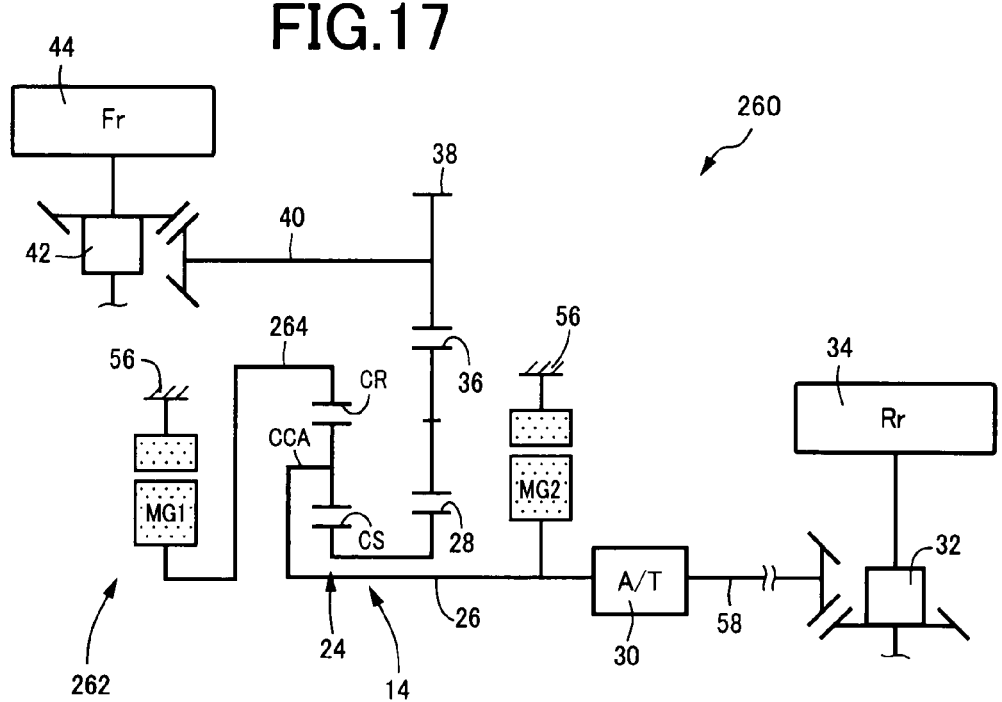
FIG. 17 is a diagram for explaining other embodiments of the present invention, which is the case that the power generation device is made up only the first motor generator.

FIG. 17 is a schematic for explaining another embodiment of the present invention. A power transmission device 260 has a difference in a power generation device 262 as compared to the power transmission device 10 and, in this embodiment, the power generation device 262 is made up only of the first motor generator MG1, which is integrally coupled via a power transmission member 264 to a ring gear CR that is an input rotating element of the front and rear wheel power distribution device 14.

Figure 18:
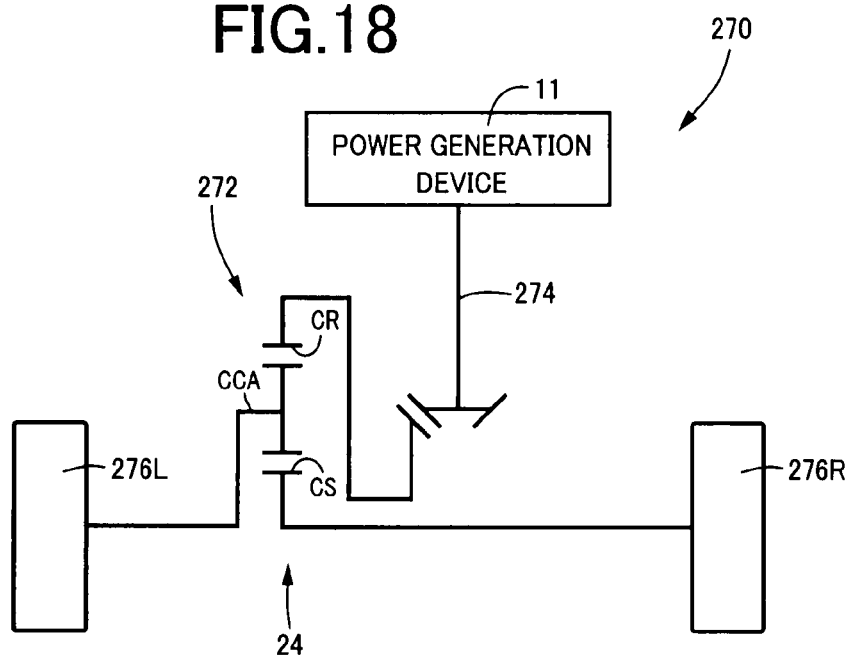
FIG. 18 is a diagram for explaining other embodiments of the present invention, which is the case that the present invention is applied to the differential control of the left and right wheel power distribution device.
Figure 19:
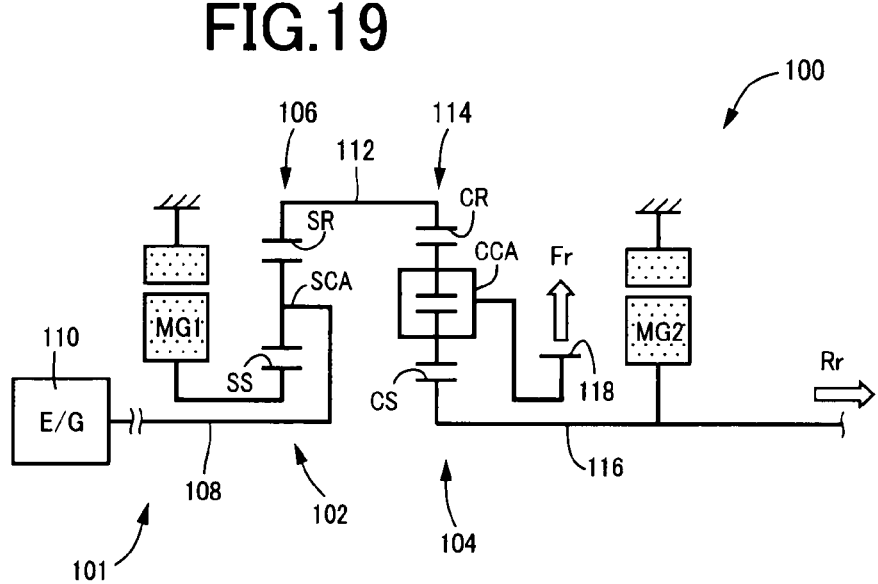
FIG. 19 is a schematic for explaining an example of the conventionally power distribution device of the front and rear wheels drive vehicle.
Figure 20:
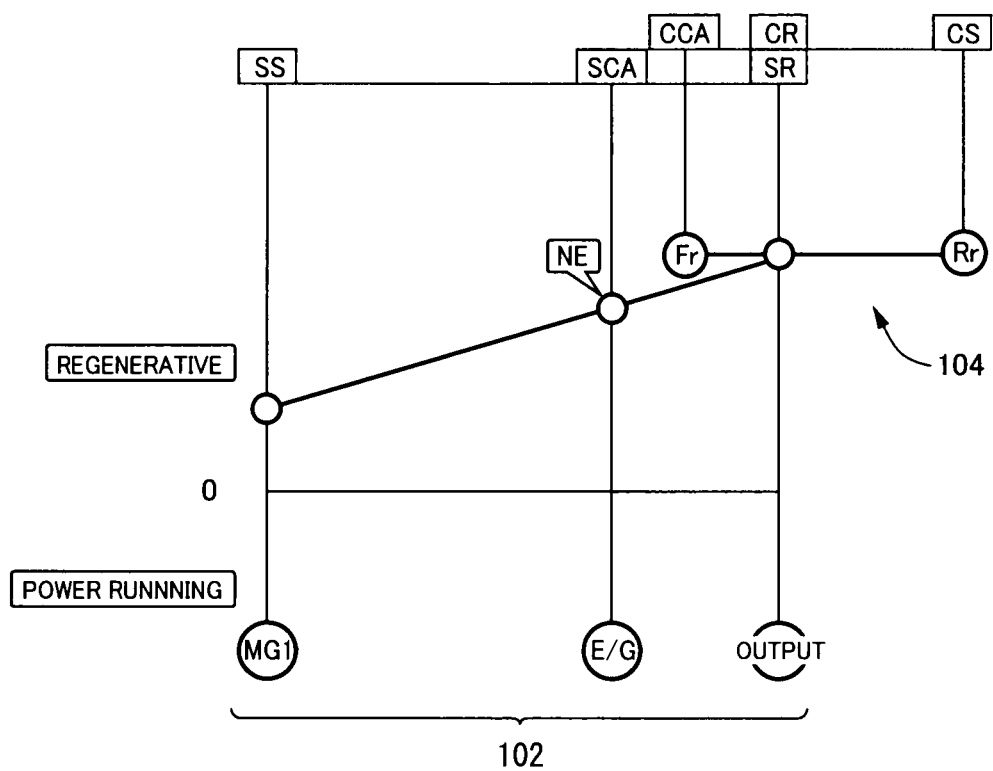
FIG. 20 is a collinear diagram capable of representing on a straight line the relationship in the rotation speeds of the three rotating elements of the electric type differential portion of the power transmission device of FIG. 19 and also depicts a collinear diagram of the front and rear wheel power distribution device.

FIG. 18 is a schematic for explaining further embodiment of the present invention. A power transmission device 270 corresponds to the case that the present invention is applied to a left and right wheel power distribution device 272 and the left and right wheel power distribution device 272 is made up mainly of the single pinion type distribution planetary gear device 24 as is the case with the first embodiment. The ring gear CR of the distribution planetary gear device 24 is an input rotating element, to which power is transmitted from the power generation device 11 via a power transmission shaft 274, etc. The power transmission shaft 274 is provided with the automatic transmission 30 as needed. The carrier CCA is a first output rotating element and operatively coupled to a left wheel 276L and the sun gear CS is a second output rotating element and operatively coupled to a right wheel 276R. The left wheel 276L corresponds to a first wheel and the right wheel 276R corresponds to a second wheel.

This power transmission device 270 can also control the operation state of the first motor generator MG1, i.e., the rotation speed NMG1 and the torque TMG1 to limit and allow the differential rotation of the first output rotating element (carrier CCA) and the second output rotating element (sun gear CS), i.e., the differential rotation of the left and right wheels 276L, 276R, and therefore, the same operational effect as the embodiment can be acquired since it is not necessary to separately provide a mechanical differential control means such as a clutch or a disc spring and the device is simply and inexpensively configured.

Although the single pinion type differential planetary gear device 16 is used as a differential mechanism in the both electric type differential portions 12 and 250 in the embodiments, a double pinion type planetary gear device can also be employed. Although the automatic transmission 30 is mounted on all the embodiments, the automatic transmission 30 is not necessarily essential to the implementation of the present invention.

Although not exemplary illustrated one by one, the present invention can be implemented in variously modified or altered forms based on the knowledge of those skilled in the art.

INDUSTRIAL AVAILABILITY

Since the vehicle power transmission device of the present invention is configured such that an input rotating element, a first output rotating element, and a second output rotating element are arranged in this order from one end to the other end on a collinear diagram capable of representing the rotation speeds of three rotating elements of a power distribution device on a straight line, the vehicle power transmission device can limit and allow the differential rotation of the first output rotating element and the second output rotating element by controlling an operation state, i.e., a rotation speed and a torque of a rotating machine of a power generation device and by controlling the rotation speed of the input rotating element and the variability of the rotation speed. Since this eliminates the need for separately providing a mechanical differential control means such as a clutch or a disc spring and the device is simply and inexpensively configured, the present invention is preferably applied to a vehicle having a power distribution device such as a front and rear wheel power distribution device that distributes power to front and rear wheels, for example.

The invention claimed is:
1. A vehicle power transmission device comprising:
a power generation device that includes a rotating machine electrically controllable in torque; and
a power distribution device including a first planetary gear device which has three rotating elements, which are an input rotating element, a first output rotating element operatively coupled to a first wheel, and a second output rotating element operatively coupled to a second wheel, the power distribution device distributing power input to the input rotating element from the power generation device to the first output rotating element and the second output rotating element,
the power distribution device being configured such that the input rotating element, the first output rotating element, and the second output rotating element are in a collinear relationship in respect of rotation speed, and are in a line in this order in a collinear diagram of representing the collinear relationship,
an operation state of the rotating machine being controlled to put the first output rotating element and the second output rotating element into a predetermined differential state, and
the power generation device including a second planetary gear device which has three rotating elements, which are coupled with a power source, the rotating machine, and the input rotating element, respectively.

2. The vehicle power transmission device of claim 1, wherein
the vehicle power transmission device calculates an operational point of the rotating machine at which the first output rotating element and the second output rotating element are put into a predetermined differential state based on a vehicle traveling state to control the rotating machine to operate at the operational point.

3. The vehicle power transmission device of claim 2, wherein
the vehicle power transmission device suppresses a rotation speed change of the rotating machine to limit a differential motion of the first output rotating element and the second output rotating element relative to each other.

4. The vehicle power transmission device of claim 1, wherein
the vehicle power transmission device suppresses a rotation speed change of the rotating machine to limit a differential motion of the first output rotating element and the second output rotating element relative to each other.

5. The vehicle power transmission device of claim 1, wherein
the vehicle power transmission device suppresses a rotation speed change of the rotating machine to limit a differential motion of the first output rotating element and the second output rotating element relative to each other and controls the power source to suppress a change in rotation speed of a differential input member due to the suppression of the rotation speed change of the rotating machine.

6. The vehicle power transmission device of claim 1, wherein
the three rotating elements of the second planetary gear device are coupled directly with the power source, the rotating machine, and the input rotating element, respectively.

7. The vehicle power transmission device of claim 1, wherein
the rotating element of the second planetary gear device that is coupled with the power source is a carrier,
the rotating element of the second planetary gear device that is coupled with the rotating machine is a sun gear, and
the rotating element of the second planetary gear device that is coupled with the input rotating element is a ring gear.

8. The vehicle power transmission device of claim 1, wherein
the input rotating element, first output rotating element, and second output rotating element of the first planetary gear device are a ring gear, carrier and sun gear, respectively.

9. The vehicle power transmission device of claim 1, wherein
the first output rotating element of the first planetary gear device is coupled with an automatic transmission.

10. A vehicle power transmission device comprising:
a power generation device that includes a rotating machine electrically controllable in torque; and
a power distribution device including a first planetary gear device which has three rotating elements, which are an input rotating element, a first output rotating element operatively coupled to a first wheel, and a second output rotating element operatively coupled to a second wheel, the power distribution device distributing power input to the input rotating element from the power generation device to the first output rotating element and the second output rotating element,
the power distribution device being configured such that the input rotating element, the first output rotating element, and the second output rotating element are in a collinear relationship in respect of rotation speed, and are in a line in this order in a collinear diagram representing the collinear relationship, and
the power generation device including a second planetary gear device which has three rotating elements, which are coupled with a power source, the rotating machine, and the input rotating element, respectively.

11. A vehicle power transmission device comprising:
a power generation device that includes a rotating machine electrically controllable in torque; and
a power distribution device including three rotating elements, which are an input rotating element, a first output rotating element operatively coupled to a first wheel, and a second output rotating element operatively coupled to a second wheel, the power distribution device distributing power input to the input rotating element from the power generation device to the first output rotating element and the second output rotating element,
the power distribution device being configured such that the input rotating element, the first output rotating element, and the second output rotating element are in a collinear relationship in respect of rotation speed, and are in a line in this order in a collinear diagram representing the collinear relationship,
an operation state of the rotating machine being controlled to put the first output rotating element and the second output rotating element into a predetermined differential state, and
the power generation device including an electric type differential portion with the rotating machine coupled to a differential mechanism in a power transmittable manner to control a differential state between a rotation speed of a differential input member and a rotation speed of a differential output member by controlling the operation state of the rotating machine, and a power source coupled to the differential input member in a power transmittable manner, wherein
the vehicle power transmission device calculates an operational point of the rotating machine at which the first output rotating element and the second output rotating element are put into a predetermined differential state based on a vehicle traveling state to control the rotating machine to operate at the operational point.

* * * * *